(12) United States Patent
Kendrekar et al.

(10) Patent No.: US 12,548,831 B2
(45) Date of Patent: Feb. 10, 2026

(54) STRUCTURAL BATTERY CELLS AND PACKS

(71) Applicant: Rivian IP Holdings, LLC, Plymouth, MI (US)

(72) Inventors: Prajanya Sunil Kendrekar, San Jose, CA (US); Susheel Teja Gogineni, Sunnyvale, CA (US); Victor Ken Prajapati, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 545 days.

(21) Appl. No.: 18/146,764

(22) Filed: Dec. 27, 2022

(65) Prior Publication Data

US 2024/0213599 A1 Jun. 27, 2024

(51) Int. Cl.
*H01M 50/202* (2021.01)
*H01M 50/169* (2021.01)
*H01M 50/296* (2021.01)
*H01M 50/514* (2021.01)

(52) U.S. Cl.
CPC ....... *H01M 50/202* (2021.01); *H01M 50/169* (2021.01); *H01M 50/296* (2021.01); *H01M 50/514* (2021.01); *H01M 2220/20* (2013.01)

(58) Field of Classification Search
CPC .. H01M 50/103; H01M 50/15; H01M 50/202; H01M 50/209; H01M 50/169; H01M 50/502

See application file for complete search history.

(56) References Cited

U.S. PATENT DOCUMENTS

| | | | |
|---|---|---|---|
| 2006/0244416 A1* | 11/2006 | Yong | H01M 50/121 320/112 |
| 2016/0372799 A1* | 12/2016 | Watanabe | H01M 50/48 |
| 2017/0309980 A1 | 10/2017 | Hong et al. | |
| 2018/0205053 A1 | 7/2018 | Ryu et al. | |
| 2020/0189400 A1 | 6/2020 | Kim et al. | |
| 2021/0126231 A1* | 4/2021 | Wang | H01M 50/209 |
| 2021/0126293 A1 | 4/2021 | Wang et al. | |
| 2022/0059901 A1 | 2/2022 | Ren et al. | |

(Continued)

FOREIGN PATENT DOCUMENTS

| | | |
|---|---|---|
| CN | 209250513 U | 8/2019 |
| CN | 211208629 U | 8/2020 |

(Continued)

OTHER PUBLICATIONS

Final Office Action on U.S. Appl. No. 18/146,786 dated Dec. 27, 2023.

(Continued)

*Primary Examiner* — Brittany L Raymond
(74) *Attorney, Agent, or Firm* — Foley & Lardner LLP

(57) ABSTRACT

A battery cell can include a body that defines a first open area, a second open area, and a first side. The first side can include a first opening. The battery cell can include a first enclosure member that can couple with the body at the first open area. The battery cell can include a second enclosure member that can couple with the body at the second open area. The body, the first enclosure member, and the second enclosure member can enclose an electrode. A length of the body and a width of the body can each be greater than a height of the body.

20 Claims, 32 Drawing Sheets

(56) References Cited

U.S. PATENT DOCUMENTS

| | | | |
|---|---|---|---|
| 2023/0080549 A1 | 3/2023 | Hu et al. | |
| 2023/0231290 A1 | 7/2023 | Rhee et al. | |
| 2024/0006730 A1* | 1/2024 | Lee | H01M 50/103 |
| 2024/0128561 A1* | 4/2024 | Wei | H01M 50/55 |

FOREIGN PATENT DOCUMENTS

| | | | |
|---|---|---|---|
| CN | 211493678 U | | 9/2020 |
| CN | 216354452 U | | 4/2022 |
| JP | 2007-267561 A1 | | 10/2007 |
| KR | 2022-0068749 | * | 5/2022 |
| WO | WO 2023-103353 | * | 6/2023 |

OTHER PUBLICATIONS

Non-Final Office Action on U.S. Appl. No. 18/146,786 dated Apr. 28, 2023.
Non-Final Office Action on U.S. Appl. No. 18/146,786 dated Aug. 28, 2024.
CN Office Action on Appln. No. 202180036854.3 dated Aug. 19, 2025.
Final Office Action on U.S. Appl. No. 18/146,786 DTD May 5, 2025.

* cited by examiner

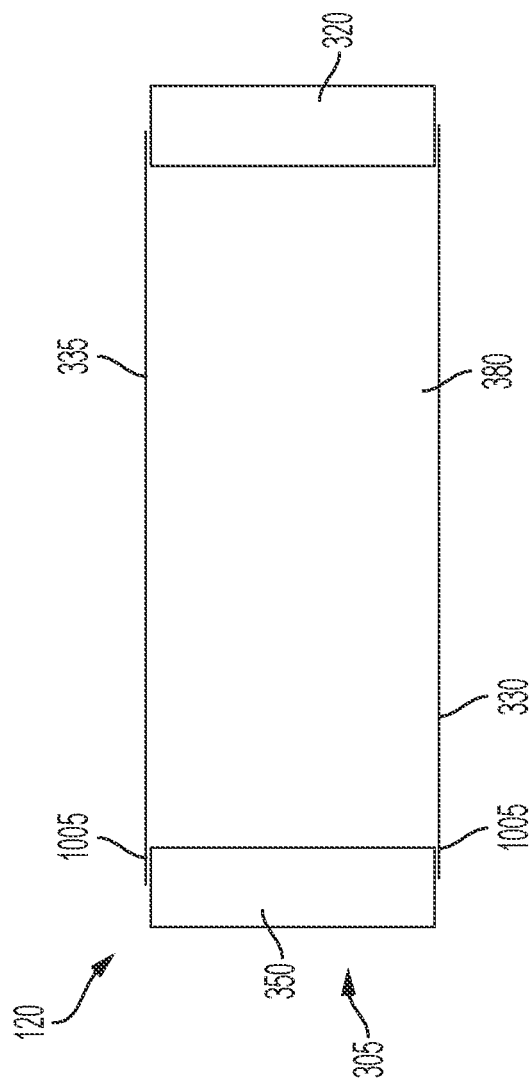

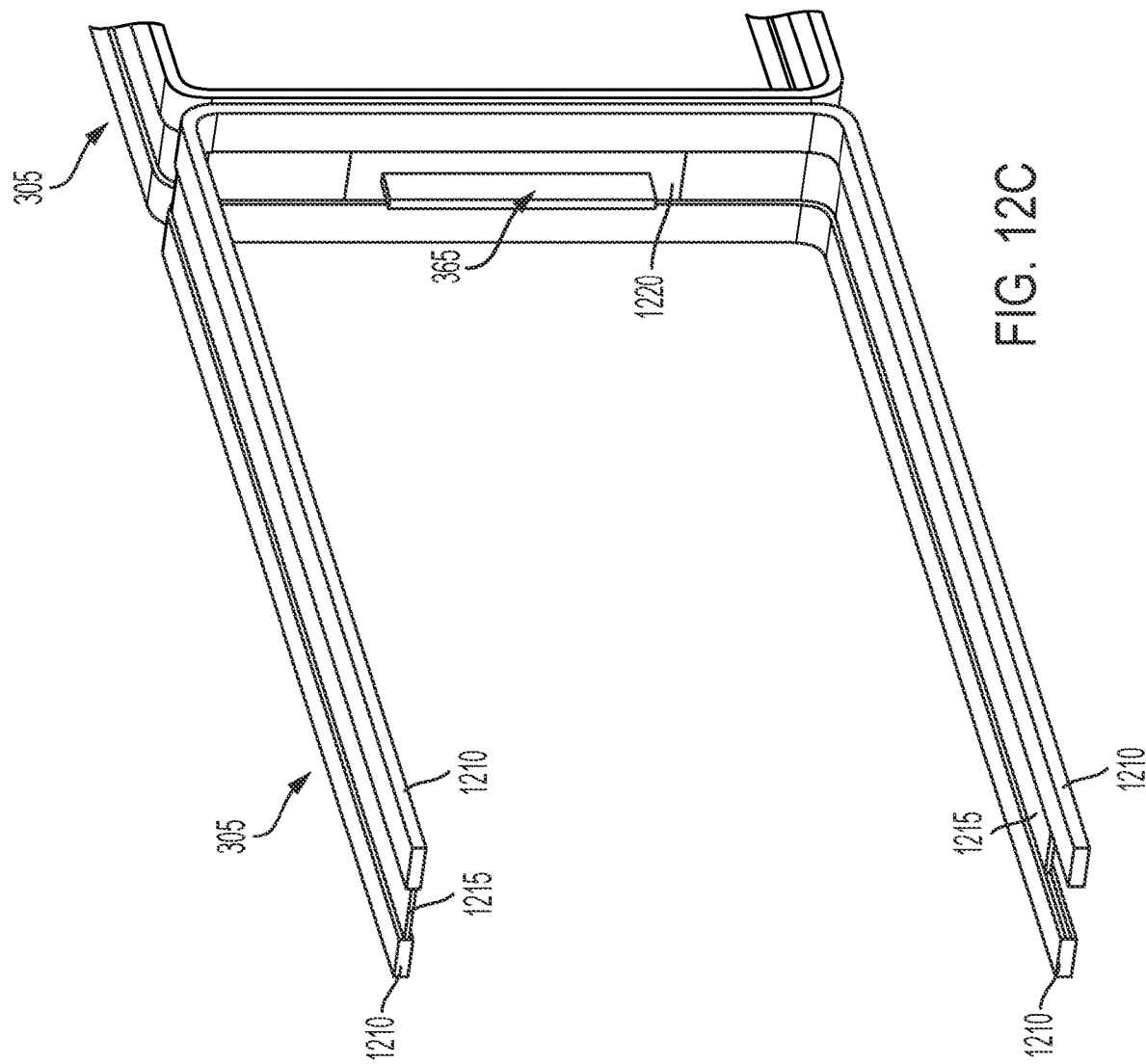

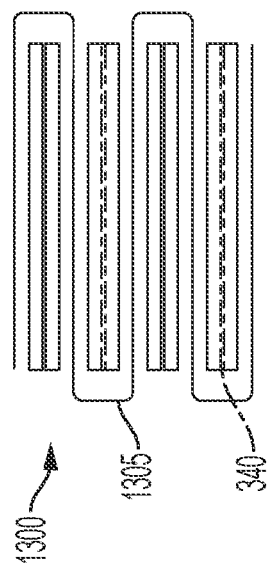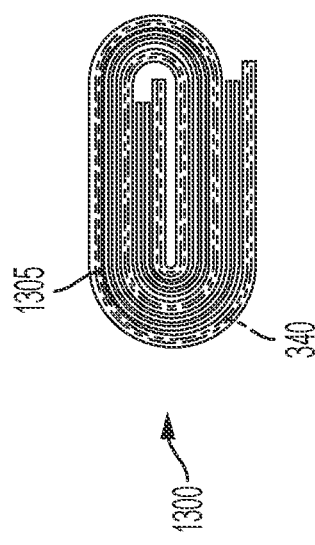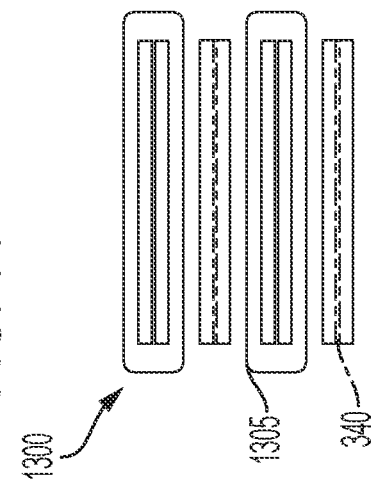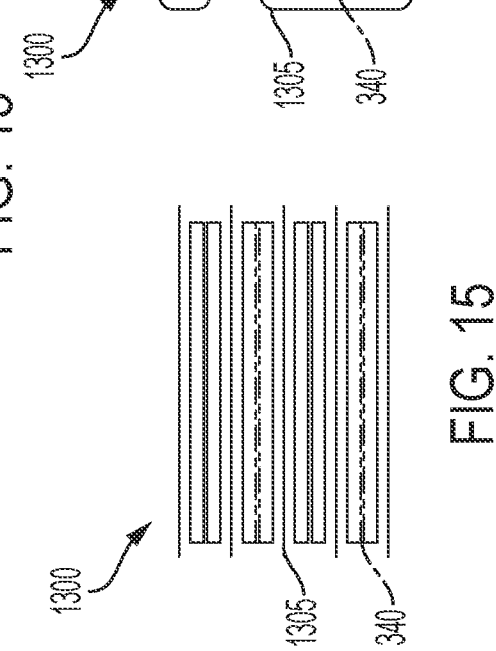

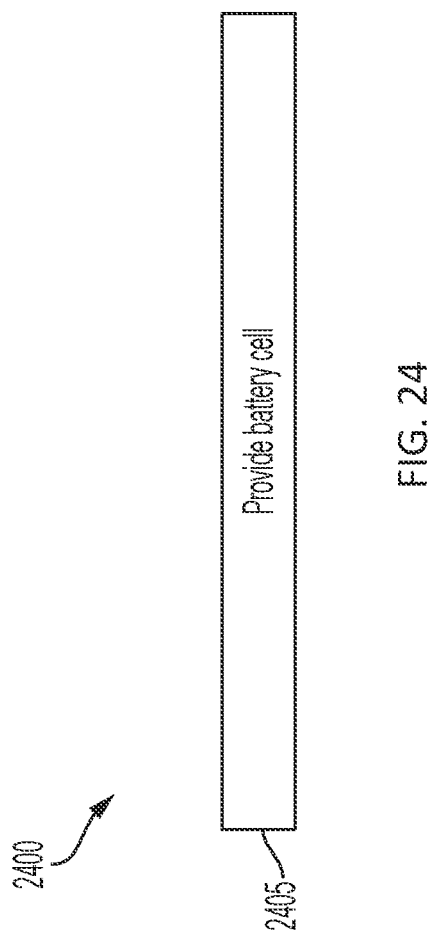

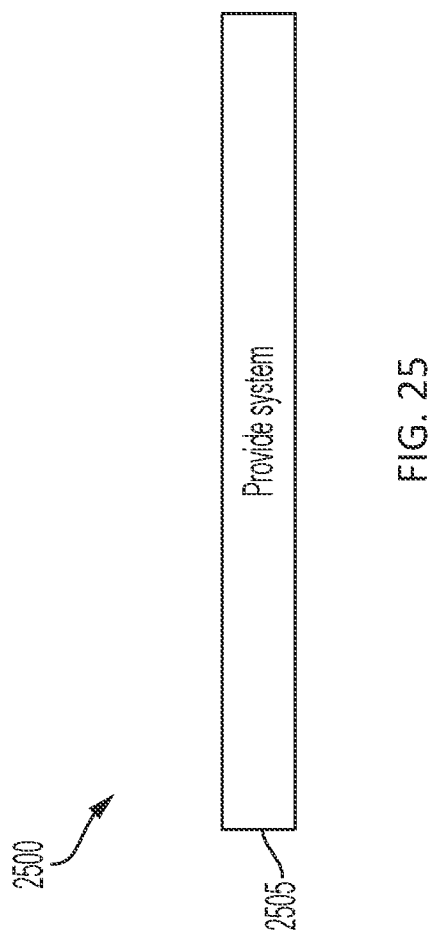

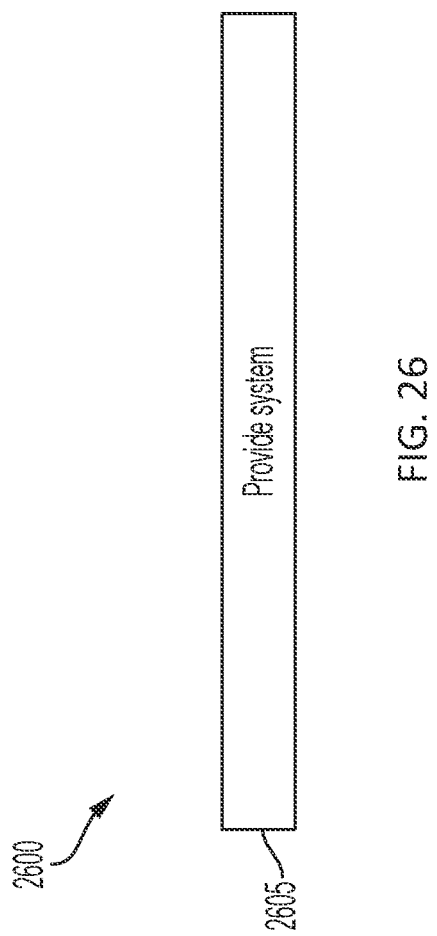

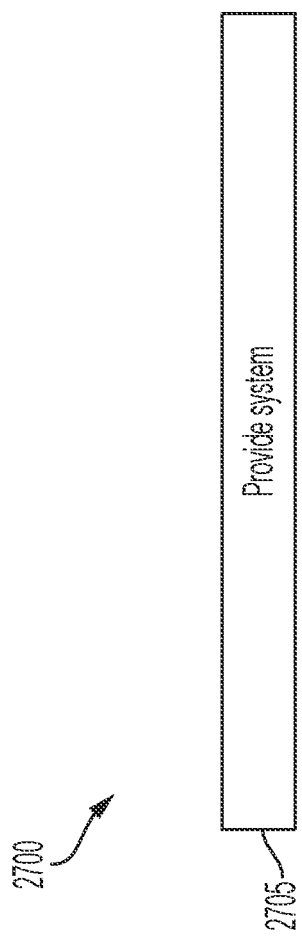

STRUCTURAL BATTERY CELLS AND PACKS

INTRODUCTION

Electric vehicles can include various electrical components that provide power to the vehicle. The electrical components can be electrically coupled with vehicle components to power the vehicle.

SUMMARY

This disclosure is generally directed to a battery cell housing. The battery cell housing can include a body having two opposing open areas. The battery cell housing can include a first enclosure member and a second enclosure member that can couple with the open areas of the body. The battery cell housing can include a generally long, thin, frame (e.g., having a high aspect ratio). The battery cell housing can electrically couple with another battery cell housing to form a cell cluster. For example, two battery cell housings can connect in series by coupling two battery cell housings laterally side-by-side such that the cell cluster forms a long, thin string of battery cells. As another example, the battery cell housings can connect by coupling two battery cell housings longitudinally overlapping one another and electrically coupling the battery cells by a busbar. The long, thin battery cell housing call allow for flexibility of manufacturing by providing a larger area of space for an electrode stack.

At least one aspect is directed to a battery cell. The battery cell can include a body that defines a first open area, a second open area, and a first side. The first side can include a first opening. The battery cell can include a first enclosure member that can couple with the body at the first open area. The battery cell can include a second enclosure member that can couple with the body at the second open area. The body, the first enclosure member, and the second enclosure member can enclose an electrode. A length of the first enclosure member and a width of the first enclosure member can each be greater than a height of the body.

At least one aspect is directed to a battery cell. The battery cell can include a body having a first side, an opposing second side, and a first enclosure member. The first side, the second side, and the first enclosure member can at least partially define an open space. The battery cell can include a second enclosure member to couple with the body. The body and the second enclosure member can enclose an electrode. A length of the first enclosure member and a width of the first enclosure member can each be greater than a height of the first side of the body.

At least one aspect is directed to a method. The method can include providing a body that defines a first open area, a second open area, and a first side. The method can include coupling a first enclosure member with the body at the first open area. The method can include coupling a second enclosure member with the body at the second open area. The method can include enclosing, by the body, the first enclosure member, and the second enclosure member, an electrode of a battery cell. A length of the first enclosure member and a width of the first enclosure member can each be greater than a height of the body.

At least one aspect is directed to a system. The system can include a first battery cell. The first battery cell can include a body that defines a first open area, a second open area, and a first side. The first side can include a first terminal. The first battery cell can include a first enclosure member that can couple with the body at the first open area and a second enclosure member that can couple with the body at the second open area. The system can include a second battery cell. The second battery cell can include a body that defines a first open area, a second open area, and a first side. The first side can include a second terminal. The second battery cell can include a first enclosure member that can couple with the body at the first open area and a second enclosure member that can couple with the body at the second open area. The first battery cell can electrically couple with the second battery cell by connecting the first terminal with the second terminal.

At least one aspect is directed to an electric vehicle. The electric vehicle can include a battery pack having a battery cell. The battery cell can include a body that defines a first open area, a second open area, and a first side. The battery cell can include a first enclosure member that can couple with the body at the first open area. The battery cell can include a second enclosure member that can couple with the body at the second open area. The body, the first enclosure member, and the second enclosure member can enclose an electrode. A length of the first enclosure member and a width of the first enclosure member can each be greater than a height of the body.

At least one aspect is directed to an electric vehicle. The electric vehicle can include a battery pack having a battery cell. The battery cell can include a body having a first side, an opposing second side, and a first enclosure member. The first side, the second side, and the first enclosure member can at least partially define an open space. The battery cell can include a second enclosure member to couple with the body. The body and the second enclosure member can enclose an electrode. A length of the first enclosure member and a width of the first enclosure member can each be greater than a height of the first side of the body.

At least one aspect is directed to an electric vehicle. The electric vehicle can include a battery pack having a battery cell system. The system can include a first battery cell. The first battery cell can include a body that defines a first open area, a second open area, and a first side. The first side can include a first terminal. The first battery cell can include a first enclosure member that can couple with the body at the first open area and a second enclosure member that can couple with the body at the second open area. The system can include a second battery cell. The second battery cell can include a body that defines a first open area, a second open area, and a first side. The first side can include a second terminal. The second battery cell can include a first enclosure member that can couple with the body at the first open area and a second enclosure member that can couple with the body at the second open area. The first battery cell can electrically couple with the second battery cell by connecting the first terminal with the second terminal.

At least one aspect is directed to a method. The method can include providing a body having a first side, an opposing second side, and a first enclosure member. The first side, the second side, and the first enclosure member can at least partially define an open space. The method can include coupling a second enclosure member with the body. The method can include enclosing, by the body and the second enclosure member, an electrode of a battery cell. A length of the first enclosure member and a width of the first enclosure member can each be greater than a height of the body.

At least one aspect is directed to a method. The method can include providing a battery cell. The battery cell can include a body that defines a first open area, a second open area, and a first side. The battery cell can include a first enclosure member that can couple with the body at the first open area. The battery cell can include a second enclosure member that can couple with the body at the second open area. The body, the first enclosure member, and the second enclosure member can enclose an electrode. A length of the first enclosure member and a width of the first enclosure member can each be greater than a height of the body.

At least one aspect is directed to a method. The method can include providing a battery cell. The battery cell can include a body having a first side, an opposing second side, and a first enclosure member. The first side, the second side, and the first enclosure member can at least partially define an open space. The battery cell can include a second enclosure member to couple with the body. The body and the second enclosure member can enclose an electrode. A length of the first enclosure member and a width of the first enclosure member can each be greater than a height of the first side of the body.

At least one aspect is directed to a method. The method can include providing a system. The system can include a first battery cell. The first battery cell can include a body that defines a first open area, a second open area, and a first side. The first side can include a first terminal. The first battery cell can include a first enclosure member that can couple with the body at the first open area and a second enclosure member that can couple with the body at the second open area. The system can include a second battery cell. The second battery cell can include a body that defines a first open area, a second open area, and a first side. The first side can include a second terminal. The second battery cell can include a first enclosure member that can couple with the body at the first open area and a second enclosure member that can couple with the body at the second open area. The first battery cell can electrically couple with the second battery cell by connecting the first terminal with the second terminal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 10 depicts an example side view of a portion of a battery cell, in accordance with implementations.

FIG. 12C depicts an example perspective view of a portion of a battery cell, in accordance with implementations.

FIG. 13 depicts an example side view of a portion of a battery cell, in accordance with implementations.

FIG. 14 depicts an example side view of a portion of a battery cell, in accordance with implementations.

FIG. 15 depicts an example side view of a portion of a battery cell, in accordance with implementations.

FIG. 16 depicts an example side view of a portion of a battery cell, in accordance with implementations.

FIG. 17 depicts an example side view of a portion of a battery cell, in accordance with implementations.

FIG. 24 depicts an example illustration of a process, in accordance with implementations.

FIG. 25 depicts an example illustration of a process, in accordance with implementations.

FIG. 26 depicts an example illustration of a process, in accordance with implementations.

FIG. 27 depicts an example illustration of a process, in accordance with implementations.

DETAILED DESCRIPTION

Figure 1:
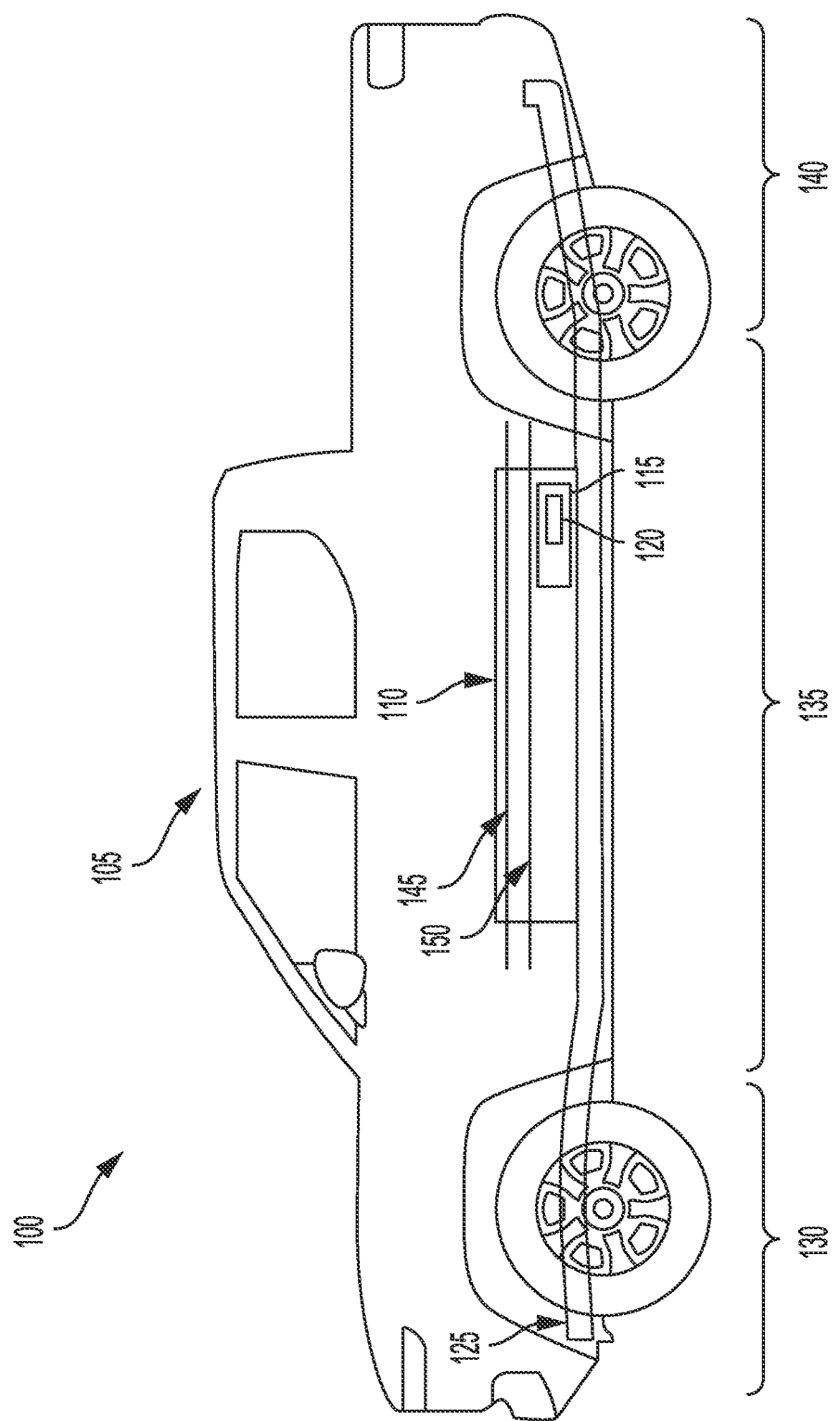
FIG. 1 depicts an example side view of an electric vehicle, in accordance with implementations.

Following below are more detailed descriptions of various concepts related to, and implementations of battery cells and methods, apparatuses, and systems of the manufacture thereof. The various concepts introduced above and discussed in greater detail below may be implemented in any of numerous ways.

This disclosure is generally directed to a battery cell housing. The battery cell housing can include a body. The body can include two opposing open areas (e.g., such that the body forms an enclosed, square, rectangular, or ring shape). The battery cell housing can include a first enclosure member (e.g., a bottom enclosure member and a second enclosure member (e.g., a top) enclosure member). The bottom enclosure member can couple with the first open area of the body (e.g., by welding). The top enclosure member can couple with the second open area of the body (e.g., by welding). The body can include a rectangular shape having four sides that at least partially surround an electrode (e.g., an electrode stack or the jelly stack). The battery cell housing can include a generally long, thin, frame. For example, the body can include a rectangular frame having a length and width larger than a height. The first enclosure member and the second enclosure member can include plain sheets of material (e.g., sheet metal) that can couple with the body by one or more welded joints. The battery cell housing can electrically couple with another battery cell housing to form a cell cluster. For example, two battery cell housings can connect in series by coupling two battery cell housings laterally side-by-side such that the cell cluster forms a long, thin string of battery cells. As another example, the battery cell housings can connect by coupling two battery cell housings longitudinally overlapping one another and electrically coupling the battery cells by a busbar. In some examples, the battery cell housing can include a rectangular body having four sides and a bottom enclosure member integrally formed with the four sides. For example, the body can be or can include one or more continuous sheets of material formed by deep drawing the sheet of material. The four sides and the bottom enclosure member can at least partially define an open space. A top plate can couple with the body by one or more welding techniques to enclose the open space. The battery cell housing can include a generally long, thin, frame. For example, the body can include a rectangular frame having a length and width larger than a height.

The systems and methods described herein have numerous technical advantages. For example, the systems and methods described herein provide a battery cell housing having a long, thin frame. The long, thin frame can allow for easy manufacturing by deep drawing a relatively short distance (e.g., a height of the battery cell housing is less than a length and width) or by allowing for a large area for welding. For example, an enclosure member (e.g., a lid component, a face plate, a ring, a cap plate, or another type of enclosure component) can couple with a body of the battery cell housing before, after, or simultaneously with an electrode of the battery cell. The long, thin battery cell housing can allow for a small insertion depth of the electrode because the height of the battery cell housing is smaller than the length and width of the battery cell. The body of the battery cell housing can include at least one opening for a terminal, fill port, vent, or other feature. The body can include two openings. The openings can oppose one another, allowing for increased access to the openings (e.g., increase venting performance and allow easy access to terminals or fill ports). The long, thin battery cell housings can allow for the battery cells to be stacked on top of one another. The battery cell housings can also withstand a force load. These and other advantages are described in greater detail herein.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
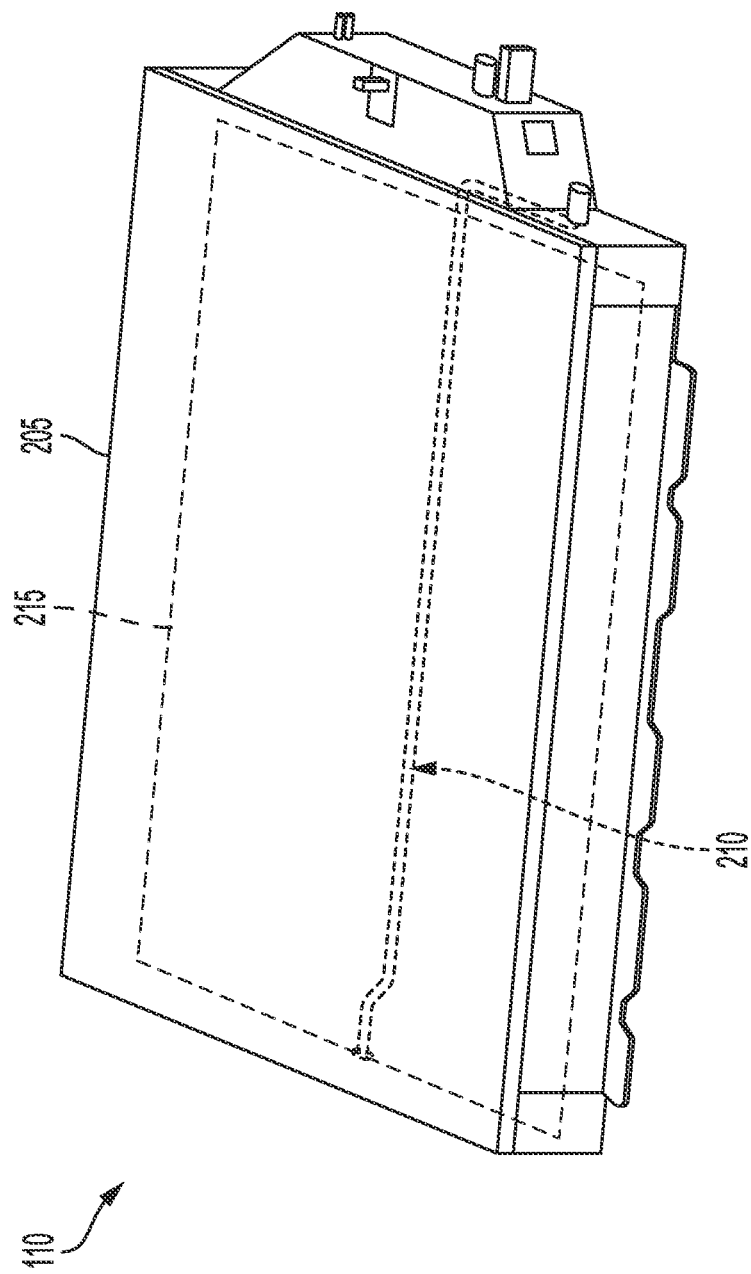
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
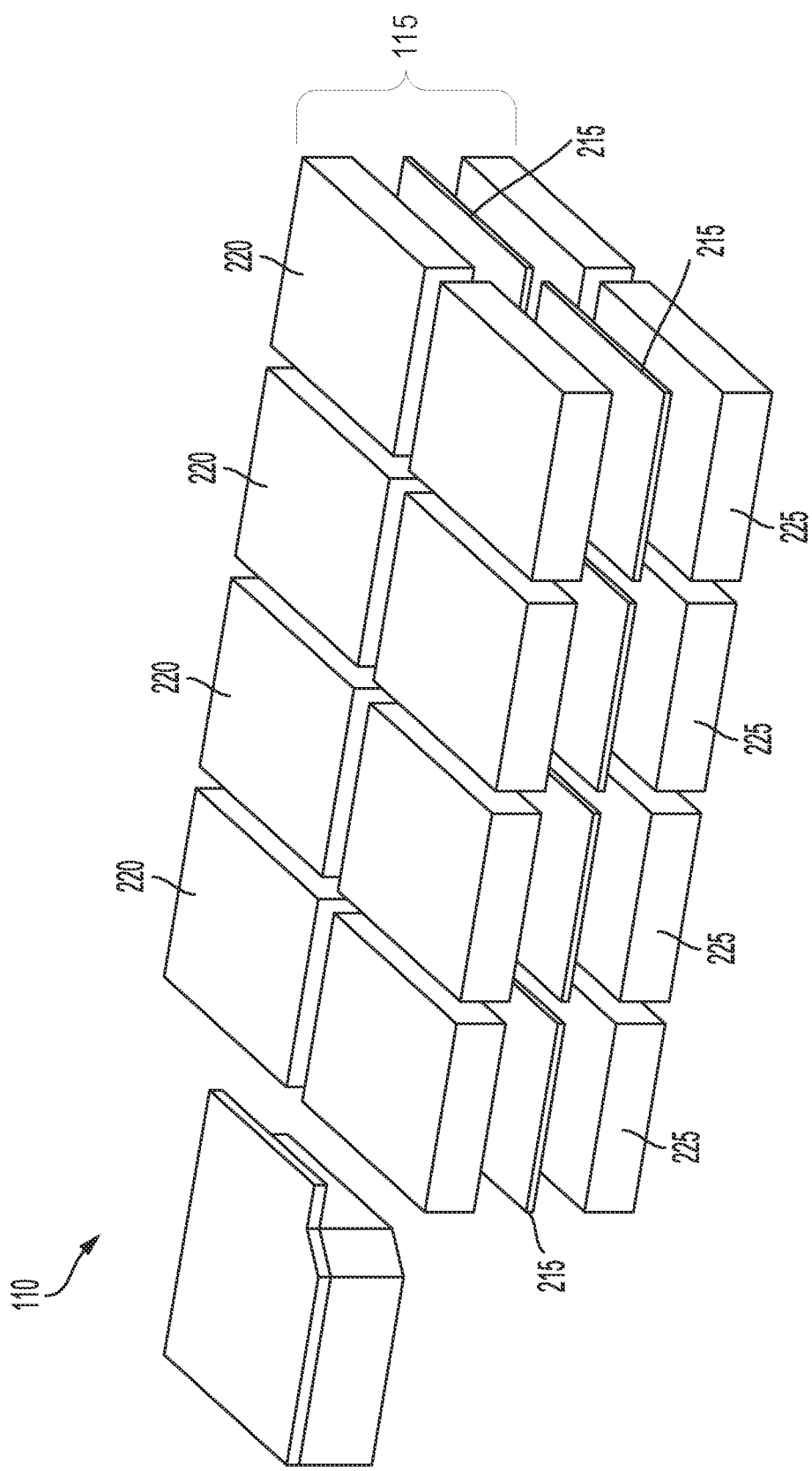
FIG. 2B depicts an example perspective view of a battery module, in accordance with implementations.
Figure 2C:
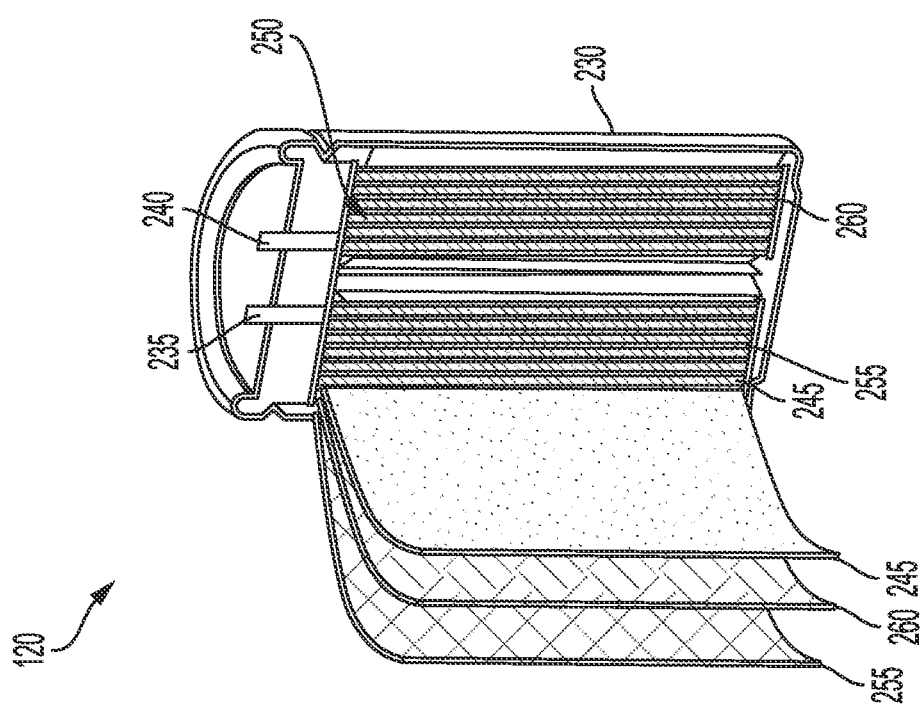
FIG. 2C depicts an example perspective view of a battery cell, in accordance with implementations.
Figure 2D:
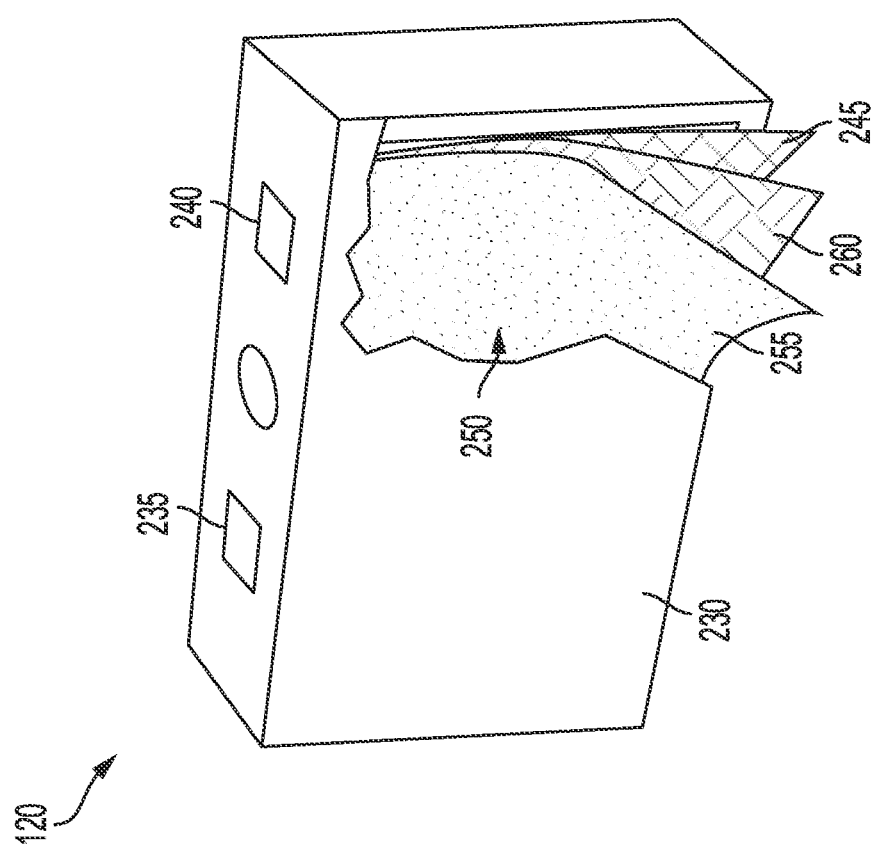
FIG. 2D depicts an example perspective view of a battery cell, in accordance with implementations.
Figure 2E:
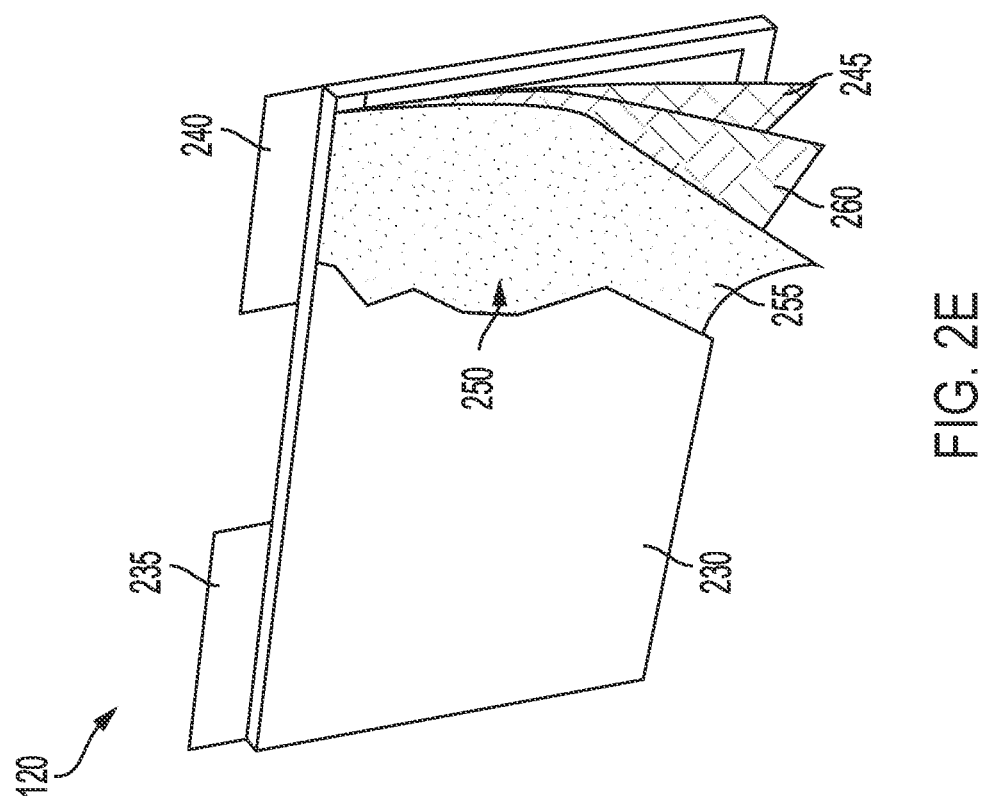
FIG. 2E depicts an example perspective view of a battery cell, in accordance with implementations.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells, pouch cells, prismatic cells, any combination thereof, or another type of cell, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated, prismatic, or any combination thereof form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120.

The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include organic polymeric-based electrolytes or inorganic electrolytes, for example phosphide-based or Sulfide-based solid-state electrolytes (e.g., $Li_3PS_4$, $Li_7P_3S_{11}$, $Li_2S$—$P_2S_5$, $Li_6PS_5Cl$). Yet further, some battery cells 120 can be solid state battery cells and other battery cells 120 can include liquid electrolytes for lithium-ion battery cells.

Figure 2F:
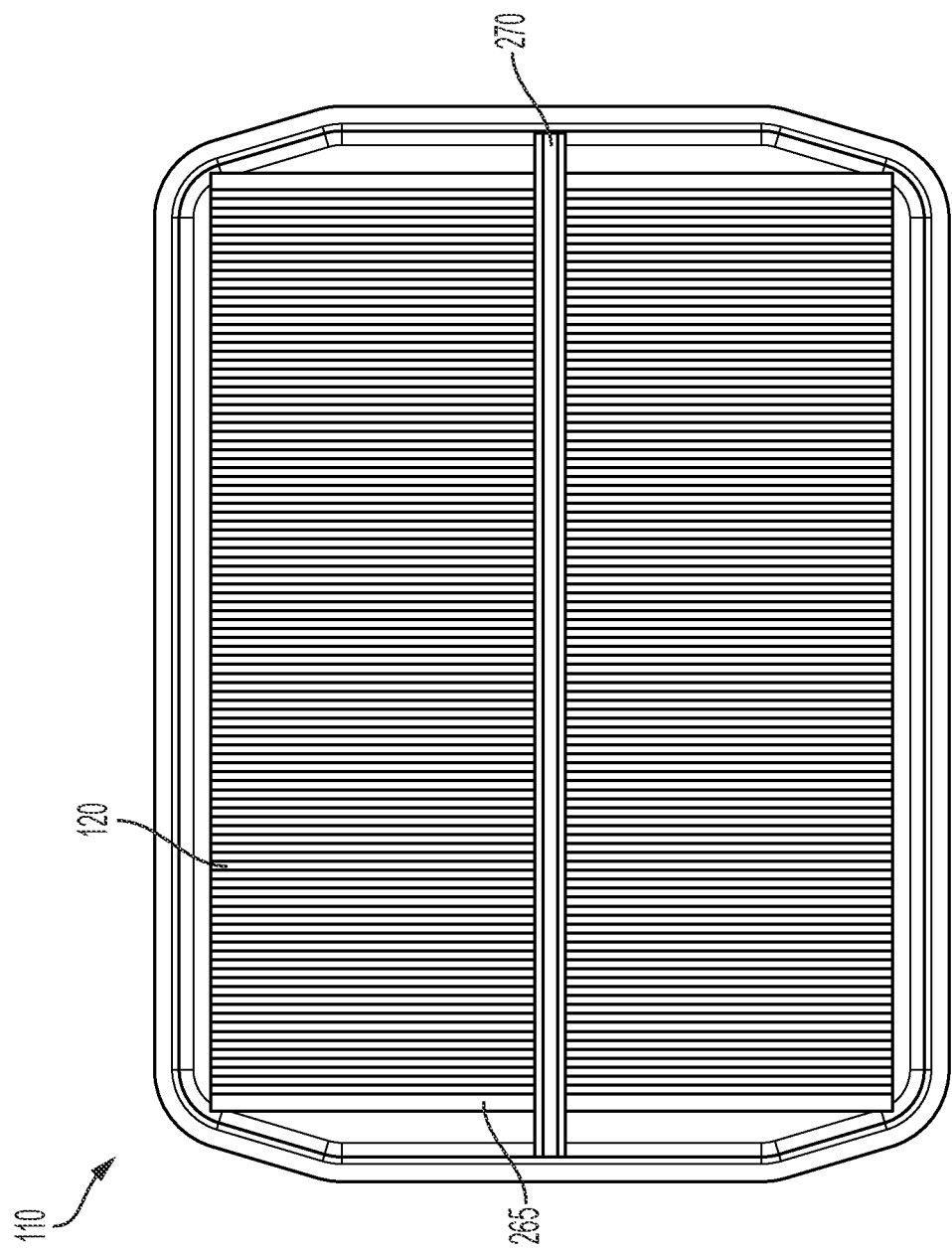
FIG. 2F depicts an example top view of a battery pack, in accordance with implementations.
Figure 2G:
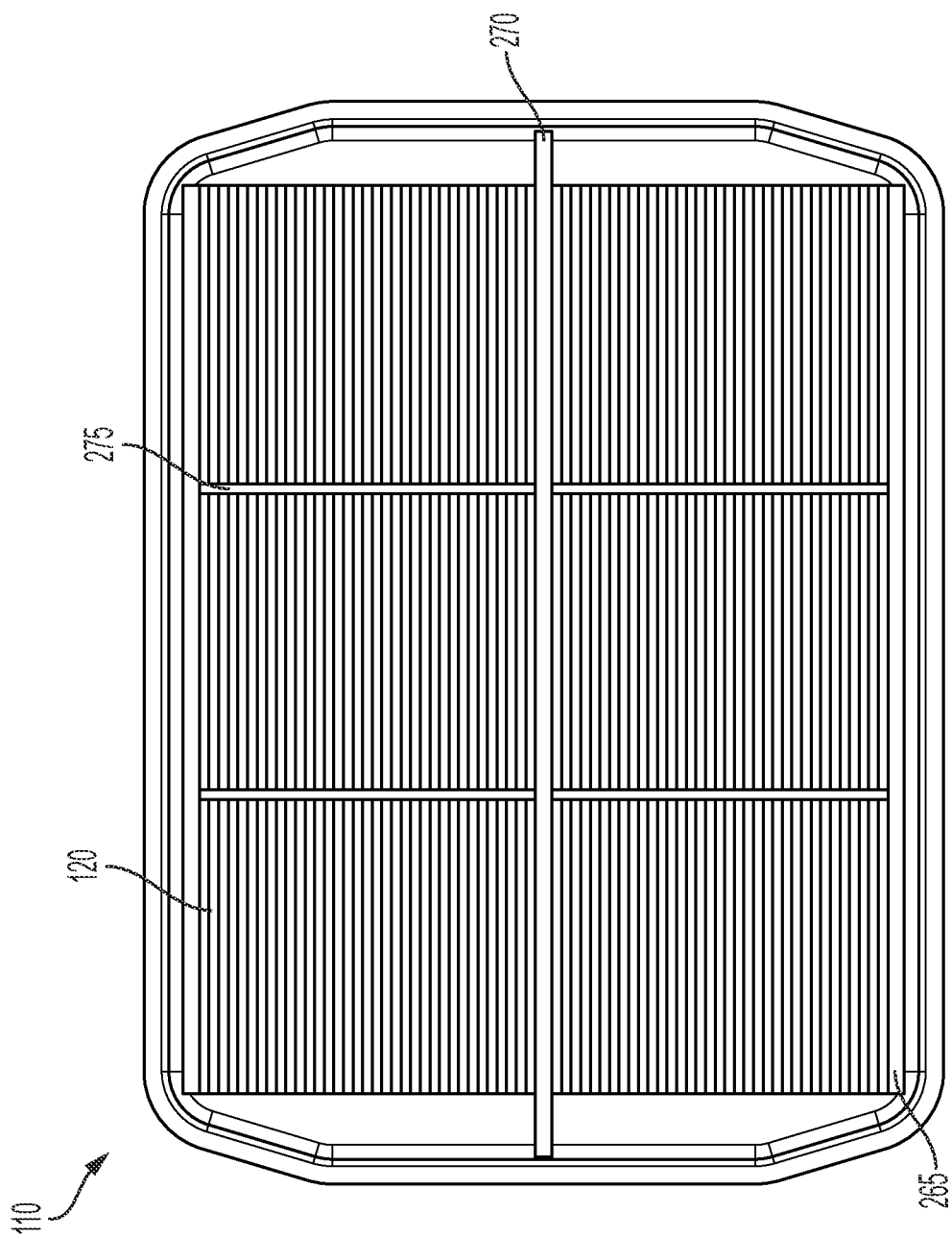
FIG. 2G depicts an example top view of a battery pack, in accordance with implementations.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, as depicted in FIGS. 2F and 2G, the battery pack can have a module-free or cell-to-pack configuration where the battery cells 120 are arranged directly into a battery pack 110 without assembly into a module. In these embodiments, the battery pack 110 can include compression members 265 that facilitate managing swelling of the battery cells 120. A structural member (e.g., cross beam) 270 can also facilitate managing swelling of the battery cells 120. As depicted in FIG. 2G, the battery pack 110 can include one or more areas 275 for interconnections in which the cells 120 are joined together (e.g., electrically) using a busbar or welding. In some examples, the battery cells 120 can extend along a majority or an entirety of the battery pack 110 such that the structural member 270 may not be necessary or included within the battery pack 110.

The battery pack 110 can include less battery cells 120 extending a width or a length of the battery pack 110 than conventional techniques. For example, as depicted in at least FIG. 2F, the battery pack 110 can include two or fewer battery cells 120 that extend across a width of the battery pack 110 (e.g., in a direction substantially perpendicular to the structural member 270). For example, an internal portion of the battery pack 110 (e.g., within the housing 230, a space for battery cells 120 to couple) can define a first width. The elongated battery cells 110 (e.g., as described in greater detail herein) can define a second width. A ratio of the second width to the first width can range between about 1:1 and about 1:2 (e.g., the internal portion can include two or fewer battery cells extending the width of the internal portion). This example is for illustrative purposes. For example, the ratio of the second width to the first width can be larger or smaller (e.g., about 1:3, about 1:4, or another ratio). The elongated battery cell width can allow for a greater energy density than conventional techniques.

As depicted in at least FIG. 2G, the battery pack 110 can include three or fewer battery cells 120 that extend across a length of the battery pack 110 (e.g., in a direction substantially parallel to the structural member 270). For example, an internal portion of the battery pack 110 (e.g., within the housing 230, a space for battery cells 120 to couple) can define a first length. The elongated battery cells 110 (e.g., as described in greater detail herein) can define a second length. A ratio of the second length to the first length can range between about 1:1 and about 1:3 (e.g., the internal portion can include three or fewer battery cells extending the width of the internal portion). This example is for illustrative purposes. For example, the ratio of the second length to the first length can be larger or smaller (e.g., about 1:4, about 1:5, or another ratio). The elongated battery cell length can allow for a greater energy density than conventional techniques.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form or pris-pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include high-nickel content (>80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride (Li$_x$PO$_y$N$_z$), lithium germanium phosphate sulfur (Li$_{10}$GeP$_2$S$_{12}$), Yttria-stabilized Zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. Whether the electrolyte layer 260 is a separator layer that can receive a liquid electrolyte (e.g., lithium ion batteries) or an electrolyte layer that can conduct ions without receiving a liquid electrolyte (e.g., solid-state batteries), the glassy electrolyte material for the electrolyte layer 260 can include, for example, lithium sulfide-phosphor pentasulfide (Li$_2$S—P$_2$S$_5$), lithium sulfide-boron sulfide (Li$_2$S—B$_2$S$_3$), and Tin sulfide-phosphor pentasulfide (SnS—P$_2$S$_5$), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
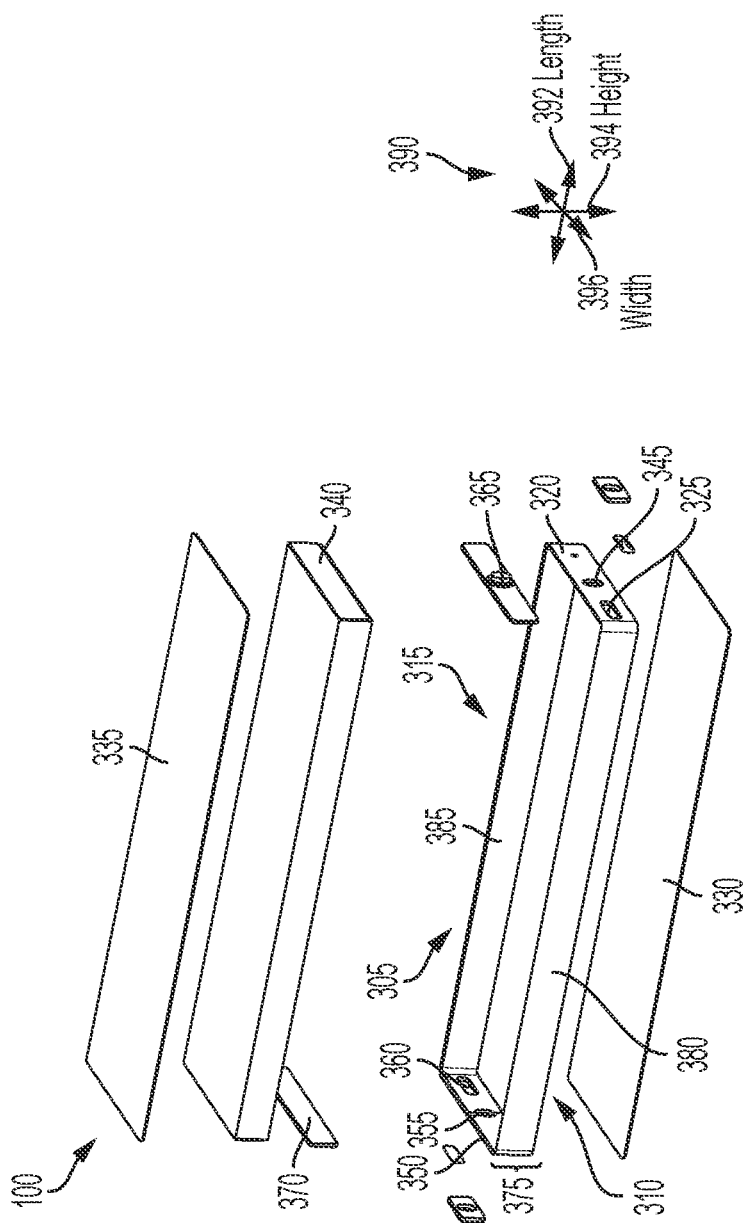
FIG. 3 depicts an example perspective view of a portion of a battery cell, in accordance with implementations.

FIG. 3 depicts an example perspective view of a portion of a battery cell 120, according to an example implementation. The battery cell 120 can include at least one body 305. For example, the body 305 can be or can form part of the battery cell housing 230 described herein. The body 305 can include various shapes including, but not limited to, a ring shape, a rectangular shape, a square shape, an enclosed shape, another shape, or various combinations thereof. The body 305 can include a first open area 310 and a second open area 315. Each of the first open area 310 and the second open area 315 can be or can include one or more areas of space defined in at least one direction. For example, the first open area 310 can include the area of space defined at least partially in between a bottom edge of a first side 320 of the body 305, a bottom edge of a second side 350 of the body 305, a bottom edge of a third side 380 of the body 305, and a bottom edge of a fourth side 385 of the body 305. The second open area 315 can include the area of space defined at least partially in between a top edge of the first side 320 of the body 305, a top edge of the second side 350 of the body 305, a top edge of the third side 380 of the body 305, and a top edge of the fourth side 385 of the body 305. In other words, the first open area 310 can include a space defined along a bottom portion of the body 305 that extends along a length and width of the body 305 (e.g., as depicted by the reference coordinate system 390, which illustrates a length axis 392 and a width axis 396 for illustrative purposes) and the second open area 315 can include a space defined along a top portion of the body 305 that extends along a length and width of the body 305. The first open area 310 and the second open area 315 can include substantially planar areas (e.g., substantially two-dimensional). The body 305 can define a generally rectangular ring shape having the first open area 310 and the second open area 315. The body 305 can be formed by one or more techniques including, but not limited to, extrusion, stamping, or welded one or more materials.

The battery cell 120 can include at least one first enclosure member 330. For example, enclosure members 330 can include one or more members of a structure corresponding to a can, a cap, a face plate, a ring, or any portion or combination thereof. For example, the first enclosure member 330 can be or can include one or more sheets of material that can couple with a portion of the body 305. The first enclosure member 330 can couple with the body 305 at the first open area 310. For example, the first enclosure member 330 can extend a length and width that substantially matches the first open area 310 such that the first enclosure member 330 can couple with the body 305 at the first open area 310 to enclose (e.g., surround, cover, position next to) the first open area 310. The first enclosure member 330 can be smaller or larger than the first open area 310 in one or more directions (e.g., in length or width). The first enclosure member 330 can couple with the body 305 in a variety of ways. For example, the first enclosure member 330 can be welded with the body 305 (e.g., at one or more portions of the first side 320, the second side 350, the third side 380, or the fourth side 385 of the body 305) such that the first enclosure member 330 and the body 305 connect by one or more welded joints. The first enclosure member 330 can couple with the body 305 in various other ways including by fasteners or adhesives. The first enclosure member 330 can be or can include one or more flat sheets of material such that the first enclosure member 330 includes at least one flat (e.g., plain) surface. The first enclosure member 330 can include one or more components (e.g., openings or other features) on the first enclosure member 330. The first enclosure member 330 can include one or more flexible materials (e.g., a flexible polymer). For example, the battery cell 120 can be in the form of a pris-pouch form (e.g., a prismatic pouch having one or more rigid and flexible materials) factor. The body 305 can include one or more rigid portions and the first enclosure member 330 can include one or more flexible portions.

The battery cell 120 can include at least one second enclosure member 335. For example, enclosure members 335 can include one or more members of a structure corresponding to a can, a cap, a face plate, a ring, or any portion or combination thereof. For example, the second enclosure member 335 can be or can include one or more sheets of material that can couple with a portion of the body 305. The second enclosure member 335 can couple with the body 305 at the second open area 315. For example, the second enclosure member 335 can extend a length and width that substantially matches the second open area 315 such that the second enclosure member 335 can couple with the body 305 at the second open area 315 to enclose (e.g., surround, cover, position next to) the second open area 315. The second enclosure member 335 can be smaller or larger than the second open area 315 in one or more directions (e.g., in length or width). The second enclosure member 335 can couple with the body 305 in a variety of ways. For example, the second enclosure member 335 can be welded with the body 305 (e.g., at one or more portions of the first side 320, the second side 350, the third side 380, or the fourth side 385 of the body 305) such that the second enclosure member 335 and the body 305 connect by one or more welded joints. The second enclosure member 335 can couple with the body 305 in various other ways including by fasteners or adhesives. The second enclosure member 335 can be or can include one or more flat sheets of material such that the second enclosure member 335 includes at least one flat (e.g., plain) surface. The second enclosure member 335 can include one or more components (e.g., openings or other features) on the second enclosure member 335.

The first enclosure member 330 and the second enclosure member 335 can couple with the body 305 such that the body 305, the first enclosure member 330 and the second enclosure member 335 can enclose at least one electrode 340. For example, the body 305 can receive the electrode 340 (e.g., prior to coupling the enclosure members, simultaneously with coupling the enclosure members, or after coupling the enclosure members via one or more fill ports) such that the electrode 340 is disposed at least partially within the body 305, the first enclosure member 330, and the second enclosure member 335 (e.g., the body 305, the first enclosure member 330, and the second enclosure member 335 form the battery cell housing 230).

The electrode 340 can form a portion of an electrode stack (e.g., the jelly roll) of a battery cell 120. For example, as described herein, the electrode 340 can include or can be an anode layer 245 or a cathode layer 255. The electrode stack can include a plurality of electrodes 340 having one or more separators between the electrodes 340. For example, the electrode stack can include a first electrode 340 (e.g., an anode layer 245), a separator layer, and a second electrode 340 (e.g., a cathode layer 255) coupled together to form the electrode stack, as described in greater detail herein. The electrode stack can include any number of electrodes 340. One electrode 340 is described herein for illustrative purposes.

Each electrode 340 can include an active or coated region and an uncoated (e.g., inactive) region. The coated region can include an active material that is coated on a thin metallic surface (e.g., a metallic foil). For example, the coated region can include coating a foil formed of aluminum, copper, nickel, or another metallic material with an active material such as metal oxide, graphite, carbon black, carbon nanotubes, Super P carbon black material, Ketjen Black, Acetylene Black, SWCNT, MWCNT, graphite, carbon nanofiber, graphene, high-nickel content (>80% Ni) lithium transition metal oxide, a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"), or another active material.

The battery cell 120 can include a generally long, thin shape (e.g., a high aspect ratio). For example, a length of the first enclosure member 330 (e.g., along the length axis 392 in a direction that extends laterally from the first side 320 of the body 305 towards the second side 350) and a width of the first enclosure member 330 (e.g., along a width axis 396 that is perpendicular to the length axis 392 and a height axis 394) can each be greater in dimension than a height 375 of the body 305 (e.g., in a direction that extends from the first open area 310 towards the second open area 315) such that the body 305 generally defines a long, thin (e.g., in height, along the height axis 394) shape. In other words, the body 305 of the battery cell 120 can lay flat on a surface such that the first enclosure member 330 lies flush with the surface and the height 375 of the body 305 extending away from the surface can be less than both a length of the first enclosure member 330 (e.g., that is in contact with the surface) and a width of the first enclosure member 330 (e.g., that is in contact with the surface). The long, thin body 305 can allow for a short insertion depth of the electrode 340. For example, the length of the body 305 can be longer than the height 375 such that the corresponding length of the electrode stack received by the body 305 is longer than the height of the electrode stack.

The first side 320 of the body 305 can include at least one opening or other feature. For example, the first side 320 can include at least one first opening 325. The first opening 325 can be or can include a filling port (e.g., to fill the body 305 with electrolyte material), a vent (e.g., to vent various gases), a through hole, or various other features. The first side 320 can include at least one second opening 345. The second opening 345 can be or can include a filling port (e.g., to fill the body 305 with electrolyte material), a vent (e.g., to vent various gases), a through hole, or various other features. The first side 320 can include more than two openings (e.g., three openings, four openings, or more).

The second side 350 of the body 305 can include at least one opening or other feature. For example, the second side 350 can include at least one third opening 355. The third opening 355 can be or can include a filling port (e.g., to fill the body 305 with electrolyte material), a vent (e.g., to vent various gases), a through hole, or various other features. The second side 350 can include at least one fourth opening 360. The fourth opening 360 can be or can include a filling port (e.g., to fill the body 305 with electrolyte material), a vent (e.g., to vent various gases), a through hole, or various other features. The second side 350 can include more than two openings (e.g., three openings, four openings, or more). The third side 380, the fourth side 385, the first enclosure member 330, or the second enclosure member 335 of the body 305 can additionally or alternatively include one or more openings or other components (e.g., vents, fill ports, terminals, or other features). The first opening 325, the second opening 345, the third opening 355, or the fourth opening 360 can each be the same or can each include varying configurations.

The first side 320 of the body 305 can include at least one first terminal 365. For example, at least one first terminal 365 can be disposed at or protrude from the first side 320 of the body 305. The first terminal 365 can be or can include an anode terminal or a cathode terminal. The second side 350 of the body 305 can include at least one second terminal 370. For example, at least one second terminal 370 can be disposed at or protrude from the second side 350 of the body 305. The second terminal 370 can be or can include an anode terminal or a cathode terminal. The second terminal 370 can oppose the first terminal 365 (e.g., if the first terminal 365 is an anode, the second terminal 370 can be a cathode). The second terminal 370 may not oppose the first terminal 365. The first side 320 of the body 305 can oppose the second side 350 of the body 305. For example, the first side 320 of the body 305 can oppose the second side 350 of the body 305 such that the first terminal 365 is positioned opposite to the second terminal 370.

Figure 4:
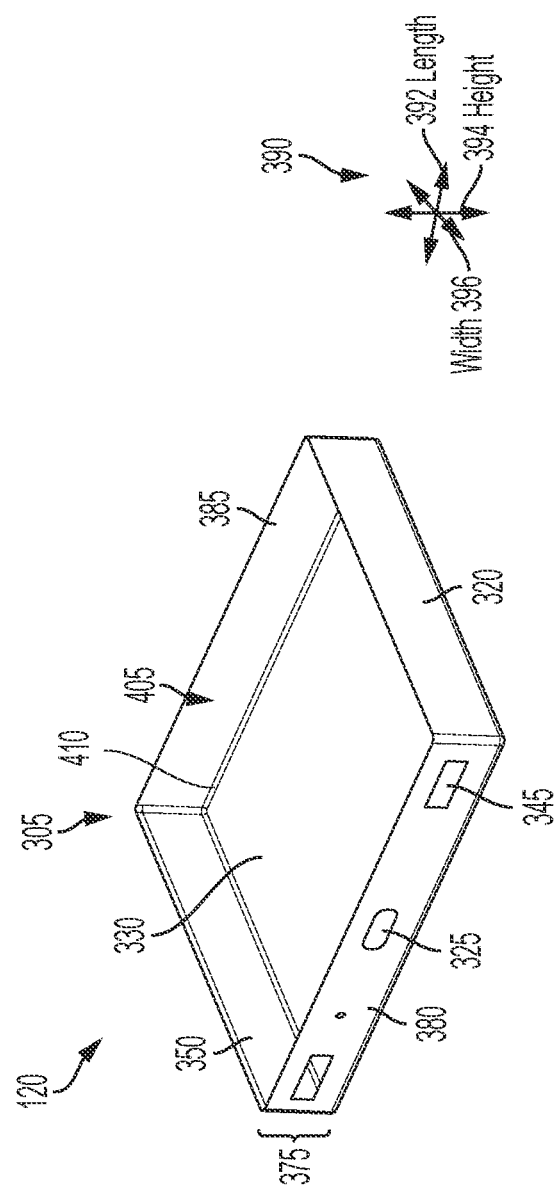
FIG. 4 depicts an example perspective view of a portion a battery cell, in accordance with implementations.

FIG. 4 depicts an example perspective view of a battery cell 120, according to an example implementation. The body 305 of the battery cell 120 can include the first enclosure member 330 integrally (e.g., monolithically) formed with the body 305 (e.g., with the first side 320, the second side 350, the third side 380, or the fourth side 385). The first side 320, the second side 350, the third side 380, or the fourth side 385 of the body 305 can at least partially define an open space 405 of the battery cell 120. For example, the open space 405 can include an open area extending laterally and longitudinally (e.g., along the length axis 392 and along the width axis 396) along a topmost portion of the body 305. The open space 405 can include an open volume extending in a height direction (e.g., along the height axis 394) between the first side 320, the second side 350, the third side 380, and the fourth side 385. The open space 405 can include a volume of open space that is enclosed at least at a first end (e.g., the first enclosure member 330 can be formed with the body 305 to enclose the open volume of space 405 at a first end). The body 305 can couple with the second enclosure member 335 (visible in at least FIG. 1 and FIG. 8) such that the second enclosure member 335 at least partially encloses, surrounds, contacts, or abuts the open space 405 at a second end that is opposite the first end (e.g., opposite the first enclosure member 330). The open space 405 can receive one or more of the electrodes 340 such that the electrode 340 can be enclosed by the body 305 (e.g., the first side 320, the second side 350, the third side 380, and the fourth side 385 of the body 305) and by the second enclosure member 335. The body 305 can couple with the second enclosure member 335 by various techniques including welding, fasteners, or adhesives.

The body 305 can include the first side 320, the second side 350, the third side 380, the fourth side 385, and the first enclosure member 330 formed as one or more continuous sheets of material. For example, the body 305 can be formed by deep drawing (e.g., drawing a sheet of material into a forming die by a punch) a sheet of material in a direction from the open space 405 towards the first enclosure member 330 (e.g., in a direction parallel with the height axis 394). The body 305 can be formed from various other processes and techniques including, but not limited to, stamping, forging, casting, punching, extrusion, machining, cutting, or other techniques.

The configuration of the body 305 (e.g., the long, thin body 305) can improve manufacturability of the body 305. For example, less material (e.g., a thinner raw sheet of material) can be used to form the body 305 through deep drawing as opposed to if the height 375 were greater than or equal to the length or width because the material is stretched significantly less than if the height 375 were greater than or equal to the length. In conventional designs, deep drawing thin sheets of material becomes difficult when the sheet of material is drawn very deep (e.g., over 50-100 mm). However, having the height of the body 305 being significantly smaller than the length or the width allows for deep drawing with thinner materials. For example, the body 305 can be formed by deep drawing a raw sheet of material having a thickness that is 25-80% thinner than if the height 375 were greater than or equal to the length of width of the body 305 (e.g., a sheet having a starting thickness of 0.1 or 0.5 mm as opposed to 1.5 or 2 mm). This example is for illustrative purposes. The sheet of material used to form the body 305 can be significantly greater or lesser than 2 mm. For example, the sheet of material can be 0.05 mm. The sheet of material can be 1000 mm, as another example.

The thickness of at least a portion of the body 305 can be greater than the thickness of one or more portions of the enclosure members. For example, the ratio between the thickness of the sides of the body 305 to the enclosure members can be at least 2:1, at least 5:1, or at least 10:1 (e.g., 1 mm to 0.1 mm or another ratio). For example, the thickness of the sides of the body 305 as compared to one or more portions of the enclosure members can be in a range between 25:1 through 10:1. The length of the body 305 (e.g., as depicted in the length direction 392) can be significantly greater than the height 375 of the body 305 (e.g., as depicted in the height direction 394). For example, a ratio of the length or the width of the body 305 as compared to the height 375 of the body 305 can be at least 2:1, at least 10:1, at least 50:1, at least 100:1, or another ratio. The ratio of the length of the body 305 to the height 375 of the body 305 can be about 100:1 through 10:1, for example. The ratio of the length of the body 305 to the height 375 of the body 305 can be about 40:1 through 20:1, for example. For example, the length of the body 305 can be between 10 mm and 1000 mm (e.g., 300 mm, 350 mm, 400 mm, or another length). The height 375 of the body 305 can be between 0 mm and 20 mm (e.g., 10 mm, 15 mm, or another height). For example, the length of the body 305 can be about 400 mm while the height 375 of the body 305 can be about 15 mm (e.g., 80:3). A ratio of the length of the body 305 to the width of the body 305 can be in a range of about 100:1 to 2:1. For example, the ratio of the length of the body 305 to the width of the body 305 can be between about 10:1 to 2:1. For example, the width of the body 305 can be about 100 mm. These measurements are for illustrative purposes. The size of the body 305 can be significantly smaller or larger. For example, the length, width, or the height of the body 305 can vary between 1 mm and 2 m. The thickness or size of the body 305 provides an increase in rigidity and stacking ability for force distribution of the battery cell 120 compared to conventional techniques that may have a uniform thickness throughout. For example, the body 305 can include redistributed thicknesses to portions of the body 305 that need to take force.

As depicted in FIG. 4, and among others, the first side 320 of the body 305 may not include any openings. One or more of the first side 320, the second side 350, the third side 380, or the fourth side 385 can include the first opening 325, the second opening 345, or an additional opening. As described herein, the first opening 325 or the second opening 345 can be or can include a vent, a fill port, or another component or feature. One or more of the first side 320, the second side 350, the third side 380, or the fourth side 385 can include the first terminal 365 or the second terminal 370.

As described herein, the battery cell 120 can include a generally long, thin shape. For example, a length of the first enclosure member 330 (e.g., along the length axis 392 in a direction that extends laterally from the first side 320 of the body 305 towards the second side 350) and a width of the first enclosure member 330 (e.g., along a width axis that is perpendicular to the length axis 392 and a height axis 394) can each be greater in dimension than a height 375 of the body 305 (e.g., in a direction that extends from the open space 405 towards the first enclosure member 330) such that the body 305 generally defines a long, thin (e.g., in height, along the height axis 394) shape. In other words, the body 305 of the battery cell 120 can lay flat on a surface such that the first enclosure member 330 lies flush with the surface and the height 375 of the body 305 extending away from the surface can be less than both a length of the first enclosure member 330 (e.g., that is in contact with the surface) and a width of the first enclosure member 330 (e.g., that is in contact with the surface). The body 305 can include one or more radii 410 that extend along a portion of the first side 320, the second side 350, the third side 380, or the fourth side 385 between the side and the first enclosure member 330. The radius 410 can facilitate eliminating or reducing stress at the interface between the sides and the first enclosure member 330.

Figure 5:
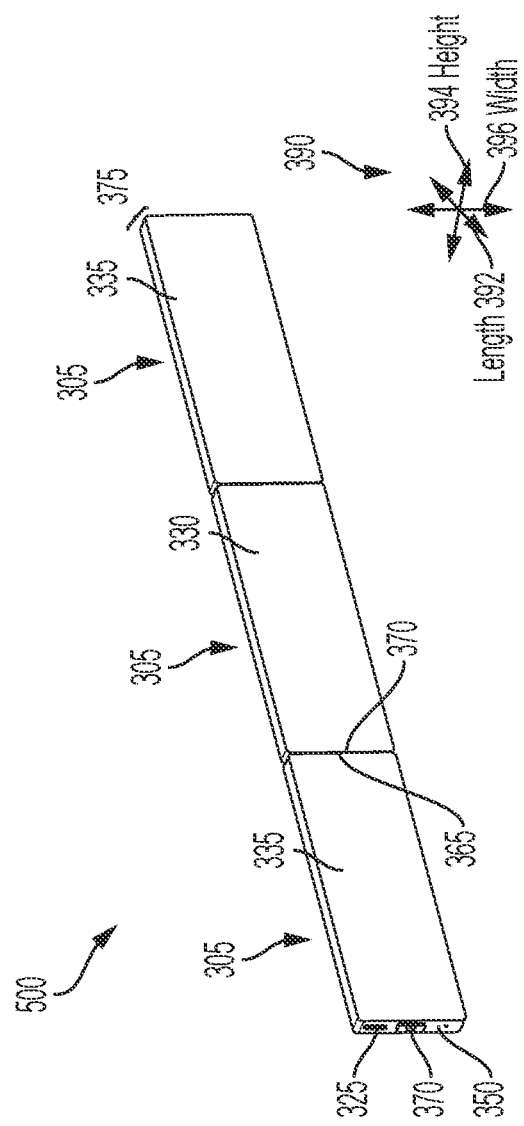
FIG. 5 depicts an example perspective view of a portion a battery cell system, in accordance with implementations.

FIG. 5 depicts an example perspective view of a battery cell system 500, in accordance with an example implementation. The system 500 can include a plurality of battery cells 120. For example, the system 500 can include two battery cells 120, three battery cells 120, four battery cells 120, or more than four battery cells 120. The system 500 can be or can include a battery cell cluster (e.g., at least two battery cells 120 coupled with one another) made of two or more battery cells 120. The system 500 can include at least two battery cells 120 electrically coupled.

The battery cells 120 can couple with one another in series by the first terminal 365 and the second terminal 370 disposed along opposing sides (e.g., the first side 320 or the opposing second side 350). For example, the battery cells 120 can couple with one another such that the cell cluster forms a long, thin string of battery cells 120 (e.g., such that the system 500 includes a larger length and width of each battery cell 120 within the system 500 than a height 375 of the battery cells 120 or the height of the system 500). For example, the battery cells 120 can couple with one another by the first side 320 and the second side 350 such that the system 500 includes a longer length than width or height. The battery cells 120 can couple with one another such that the terminals oppose one another in the string (e.g., the first terminal 365 can connect with the second terminal 370 by welding or another technique). The body 305 of the battery cells 120 in the system 500 can include the first enclosure member 330 integrally (e.g., monolithically) formed or coupled by welding. One or more spaces or insulating materials can be disposed between the first terminal 365 and the second terminal 370 when the battery cells 120 are connected. For example, the first terminal 365 and the second terminal 370 can protrude from the first side 320 or the second side 350 of the body 305 such that a space can form between the bodies 305 even when the terminals are welded together. The battery cell system 500 can withstand a greater load force (e.g., about 10% more) exerted on one or more portions of the bodies 305 of the battery cells 120 as compared to conventional battery cells 120. For example, the body 305 can receive a load and can maintain position or structure even when a load force is exerted on one or more portions of the first enclosure member 330, the second enclosure member 335, or the body 305.

Figure 6:
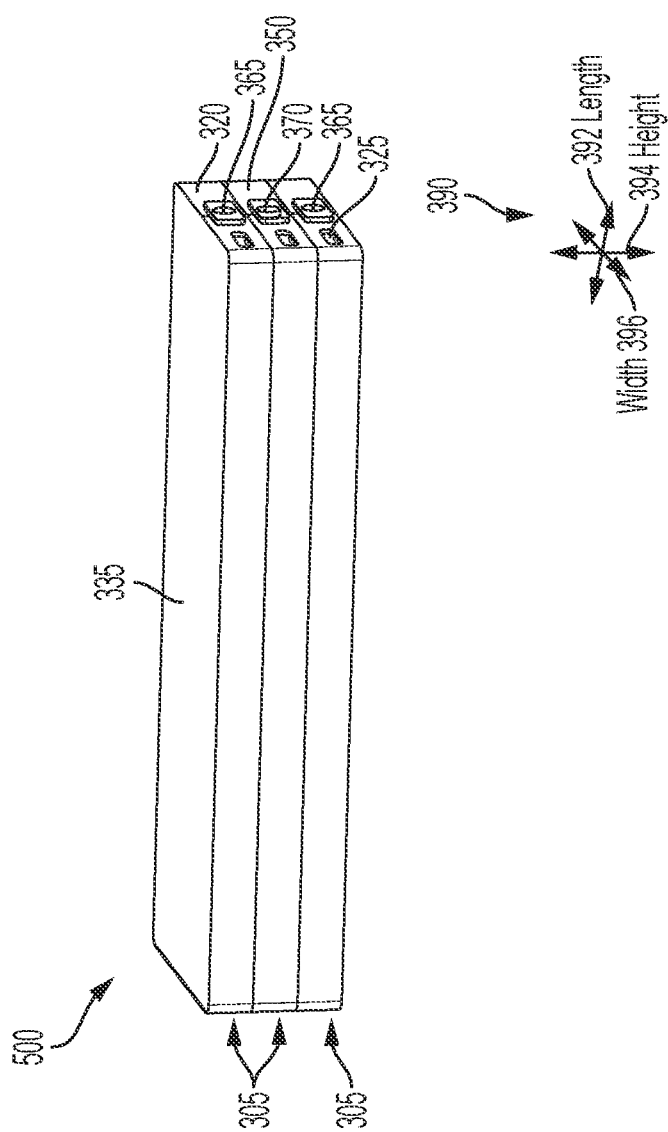
FIG. 6 depicts an example perspective view of a portion a battery cell system, in accordance with implementations

FIG. 6 depicts an example perspective view of a battery cell system 500, in accordance with an example implementation. The system 500 can include a plurality of battery cells 120. For example, the system 500 can include two battery cells 120, three battery cells 120, four battery cells 120, or more than four battery cells 120. The system 500 can be or can include a battery cell cluster (e.g., at least two battery cells 120 coupled with one another) made of two or more battery cells 120. The system 500 can include at least two battery cells 120 electrically coupled.

The battery cells 120 can couple with one another in parallel by the first terminal 365 and the second terminal 370 disposed along opposing sides (e.g., the first side 320 or the opposing second side 350) and by electrically coupling the terminals by one or more busbars or other components. For example, the battery cells 120 can couple with one another such that the cell cluster forms a tall stack of battery cells 120 (e.g., such that the system 500 includes battery cells 120 overlapping one another by the first enclosure member 330 or the second enclosure member 335). For example, the system 500 can include a larger height than width. The battery cells 120 can couple with one another such that the terminals oppose one another in the string (e.g., the first terminal 365 can connect with the second terminal 370 by a welded busbar or another technique). The body 305 of the battery cells 120 in the system 500 can include the first enclosure member 330 integrally (e.g., monolithically) formed or coupled by welding. The battery cell system 500 can withstand a greater load force (e.g., about 10% more) exerted on one or more portions of the bodies 305 of the battery cells 120 as compared to conventional battery cells 120. For example, first enclosure member 330 second enclosure member 335 the body 305 can receive a load and can maintain position or structure even when a load force is exerted on one or more portions of the first enclosure member 330, the second enclosure member 335, or the body 305.

Figure 7:
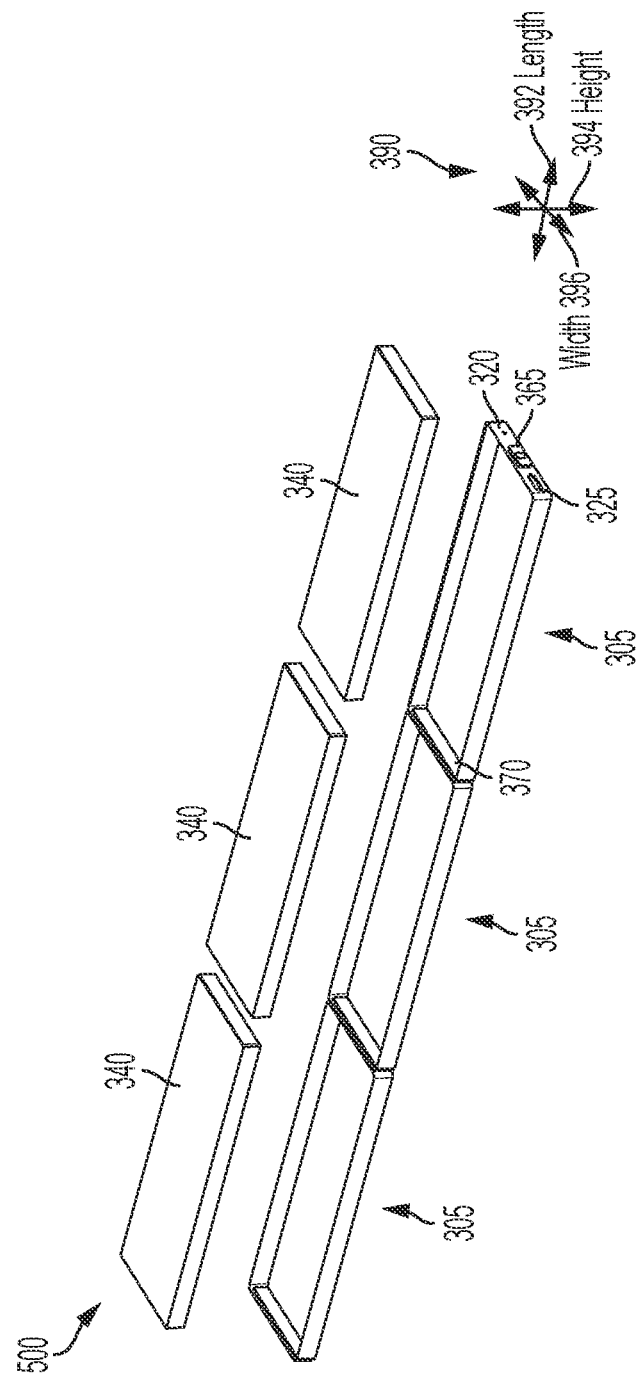
FIG. 7 depicts an example perspective view of a portion a battery cell system, in accordance with implementations.

FIG. 7 depicts an example perspective view of a battery cell system 500, in accordance with an example implementation. The system 500 can include a plurality of battery cells 120. For example, the system 500 can include two battery cells 120, three battery cells 120, four battery cells 120, or more than four battery cells 120. The system 500 can be or can include a battery cell cluster (e.g., at least two battery cells 120 coupled with one another) made of two or more battery cells 120. The system 500 can include at least two battery cells 120 electrically coupled.

The battery cells 120 can couple with one another in series by the first terminal 365 and the second terminal 370 disposed along opposing sides (e.g., the first side 320 or the opposing second side 350) and electrically coupling by one or more busbars or other components. For example, the battery cells 120 can couple with one another such that the cell cluster forms a long, thin string of battery cells 120 (e.g., such that the system 500 includes a larger length and width of each battery cell 120 within the system 500 than a height 375 of the battery cells 120 or the height of the system 500). For example, the battery cells 120 can couple with one another by the first side 320 and the second side 350 such that the system 500 includes a longer length than width or height. The bodies 305 can be manufactured or welded together at the same time (e.g., simultaneously) or in sequence. The bodies 305 can receive each electrode 340 at the same time (e.g., simultaneously) or in sequence.

The body 305 of the battery cells 120 can couple with one another prior to each body receiving a corresponding electrode 340. For example, a first side 320 of a first body 305 can couple with a second side 350 of a second body 305 while the second enclosure member 335 is not coupled with the body 305. Each body 305 can receive an electrode 340. Each second enclosure member 335 can be welded with a portion of each body 305 to form the system 500. The battery cells 120 can couple with one another such that the terminals oppose one another in the string (e.g., the first terminal 365 can connect with the second terminal 370 by a welded joint or another technique). The body 305 of the battery cells 120 in the system 500 can include the first enclosure member 330 integrally (e.g., monolithically) formed or coupled by welding. The battery cell system 500 can withstand a greater load force (e.g., about 10% more) exerted on one or more portions of the bodies 305 of the battery cells 120 as compared to conventional battery cells 120. For example, the body 305 can receive a load and can maintain position or structure even when a load force is exerted on one or more portions of the first enclosure member 330, the second enclosure member 335, or the body 305.

Figure 8:
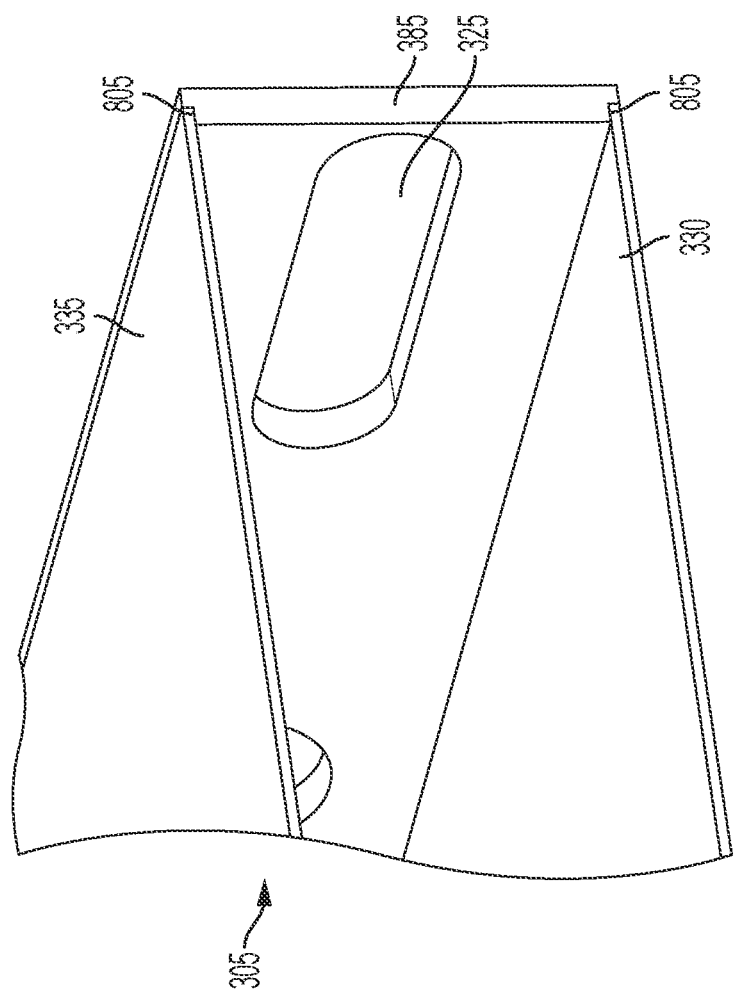
FIG. 8 depicts an example perspective view of a portion of a battery cell, in accordance with implementations.

FIG. 8 depicts a perspective view of a portion of the body 305 of the battery cell 120, according to an example implementation. As described herein, the first enclosure member 330 or the second enclosure member 335 can couple with one or more portions of the body 305 in various ways. For example, at least one of the first side 320, the second side 350, the third side 380, or the fourth side 385 can include a ledge 805 (e.g., a cut-out, a ridge, a shelf, a step, a protrusion, a projection, or another component) that extends along at least a portion of the side to at least partially receive the first enclosure member 330 or the second enclosure member 335.

The first side 320, the second side 350, the third side 380, or the fourth side 385 can include two ledges 805 at opposing ends of the side such that one ledge 805 receives a portion of the first enclosure member 330 and another ledge 805 receives a portion of the second enclosure member 335. The ledges 805 can provide at least one locating datum for placing the first enclosure member 330 or the second enclosure member 335 relative to the body 305. The first enclosure member 330 or the second enclosure member 335 can be welded with the body 305 along the corresponding ledge 805 (e.g., by laser welding, magnetic induction welding, filler welding, brazing, soldering, or any style of metal joining process that can establish a hermetic seal). The first enclosure member 330 or the second enclosure member 335 can lie flush with a portion of the body 305 (e.g., with the first side 320, the second side 350, the third side 380, or the fourth side 385) such that the first enclosure member 330 or the second enclosure member 335 is coplanar with at least a portion of the body 305. Each of the first side 320, the second side 350, the third side 380, and the fourth side 385 can include at least one ledge 805.

Figure 9A:
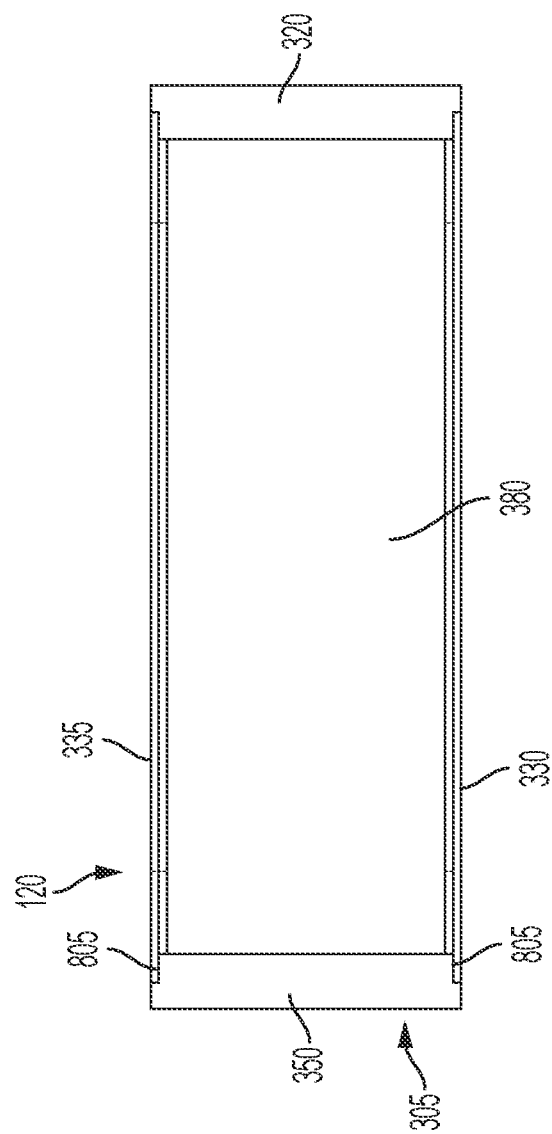
FIG. 9A depicts an example side view of a portion of a battery cell, in accordance with implementations.

FIG. 9A depicts a side view of a battery cell 120, according to an example implementation. As described herein, various sides of the body 305 of the battery cell 120 can include one or more ledges 805 to receive a portion of the first enclosure member 330 or a portion of the second enclosure member 335. For example, all the sides of the body 305 (e.g., the first side 320, the second side 350, the third side 380, and the fourth side 385) can include one or more ledges 805. One or more of the sides of the body 305 (e.g., the first side 320, the second side 350, the third side 380, or the fourth side 385) can include two or more ledges 805.

Figure 9B:
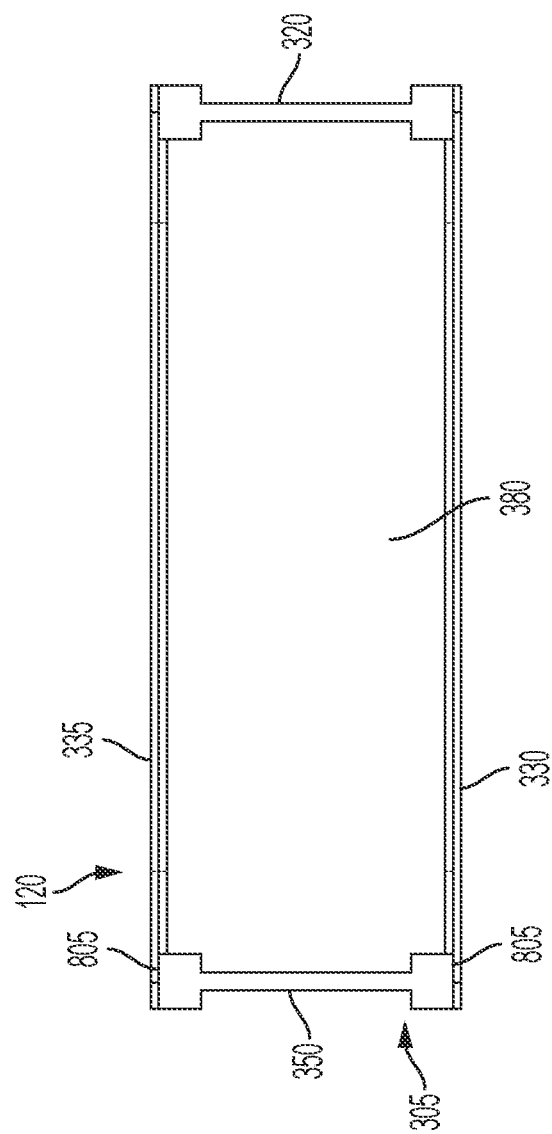
FIG. 9B depicts an example side view of a portion of a battery cell, in accordance with implementations.

FIG. 9B depicts a side view of a battery cell 120, according to an example implementation. As described herein, one or more portions of the body 305 of the battery cell 120 can include an "I" beam. For example, as depicted in at least FIGS. 9B, 12B, and 12C, at least one side (e.g., all sides) of the body 305 can include a cross section shaped as an "I" in which the topmost and bottommost portions 1210 (shown in at least FIG. 12C) of the sides are thicker than the middle section 1215 of the sides. For example, the body 305 can be formed from one or more sheets of material having an "I" beam cross sectional profile, as depicted in at least FIG. 12C. The one or more sheets can be bent to form the body 305. Having the thicker materials at the topmost and bottommost sections 1210 of the sides of the body 305 can facilitate distributing a load applied to the body 305 (e.g., to increase stacking ability or rigidity of the body 305). The thickness of the "I" beam can vary. For example, the thickness between the topmost or bottommost sections 1210 of the sides of the body 305 as compared to the thickness in the middle section 1215 of the sides can differ in the range of 10:1 to 10:9 (e.g., the thickness of the middle section 1215 of the "I" beam can range between 10% thinner than the end sections 1210 to 90% thinner than the end sections 1210). FIG. 10 depicts a side view of a battery cell 120, according to an example implementation. The first enclosure member 330 or the second enclosure member 335 can couple with the body 305 by one or more lap welds 1005. For example, the lap welds 1005 can be or can include one or more portions of the first enclosure member 330 or the second enclosure member 335 that overlap a portion of the body 305 (e.g., a portion of the first side 320, the second side 350, the third side 380, or the fourth side 385) such that the first enclosure member 330 or the second enclosure member 335 can be connected to the body 305 by the overlapping portion. The first enclosure member 330 or the second enclosure member 335 can overlap one or more portions of the body 305 such that the first enclosure member 330 or the second enclosure member 335 is at least partially offset (e.g., not coplanar, not flush) with the body 305, for example.

Figure 11:
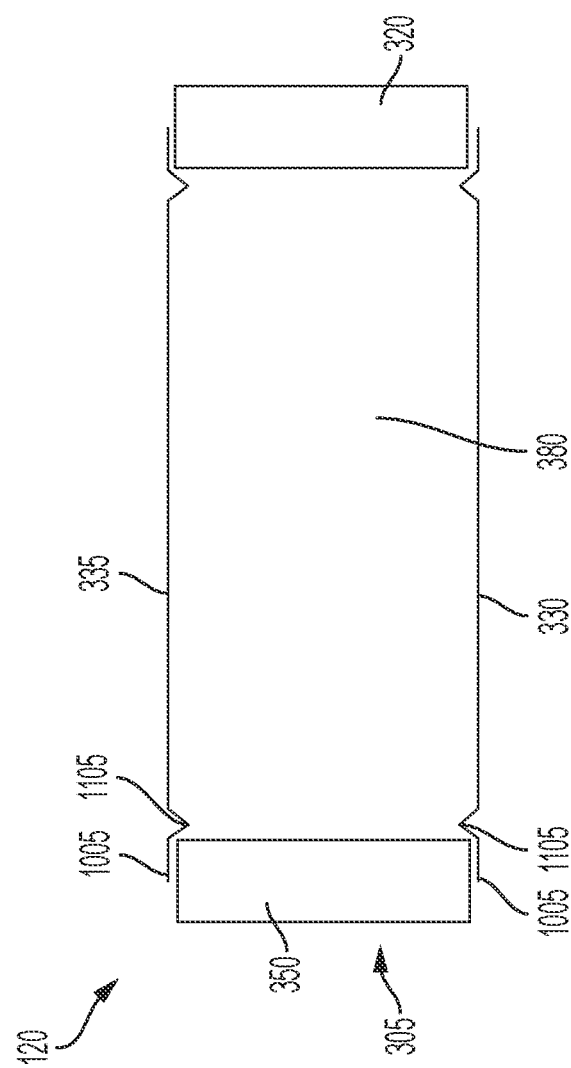
FIG. 11 depicts an example side view of a portion of a battery cell, in accordance with implementations.

FIG. 11 depicts a side view of a battery cell 120, according to an example implementation. As described herein, the first enclosure member 330 or the second enclosure member 335 can couple with the body 305 by one or more lap welds 1005. The first enclosure member 330 or the second enclosure member 335 can include one or more features to facilitate aligning or locating the first enclosure member 330 or the second enclosure member 335 with one or more portions of the body 305. For example, the first enclosure member 330 or the second enclosure member 335 can include at least one spring 1105. The spring 1105 can be or can include one or more sections of the first enclosure member 330 or the second enclosure member 335 that have been bent, stamped, pressed, deformed, or shaped to have a biasing force when compressed or extended. For example, the spring 1105 can include a triangular shape. The spring 1105 can include various other shapes including, but not limited to, a rectangular shape, a symmetrical shape, an unsymmetrical shape, or another shape.

The first enclosure member 330 or the second enclosure member 335 can include two or more springs 1105 on opposing ends of the enclosure members. The springs 1105 can be positioned such that, when the first enclosure member 330 or second enclosure member 335 is coupled with the body 305, the springs 1105 can at least partially deform (e.g., extend, compress, or another deformation) such that the springs 1105 engage (e.g., contact, push, abut) a portion of the body 305 to facilitate maintaining the first enclosure member 330 or the second enclosure member 335 in place relative to the body 305. For example, the springs 1105 can be positioned near an edge of the body 305 (e.g., an edge of the first side 320 or the second side 350) such that the springs 1105 can slightly compress to fit within the first open area 310, the second open area 315, or the open space 405 (depicted in at least FIGS. 3 and 4). When the springs 1105 protrude into the first open area 310, the second open area 315, or the open space 405, the springs 1105 can slightly extend such that the springs 1105 exert a force onto the body 305 (e.g., on an inner wall of the first side 320 or the second side 350) to facilitate maintaining the first enclosure member 330 or the second enclosure member 335 in position. One or more portions of the first enclosure member 330 or the second enclosure member 335 can couple with the body 305 by welding (e.g., a lap weld 1005), adhesives, fasteners, or by another technique. The springs 1105 can allow for easy manufacturing. For example, the body 305 can include or can have a looser tolerance (e.g., in multiple directions) as the springs 1105 can be positioned at various portions of the first enclosure member 330 or the second enclosure member 335. The springs 1105 can be positioned at one point in the first enclosure member 330 or the second enclosure member 335, along a portion of the periphery, or along an entire periphery of the first enclosure member 330 or the second enclosure member 335 (e.g., all four sides).

Figure 12A:
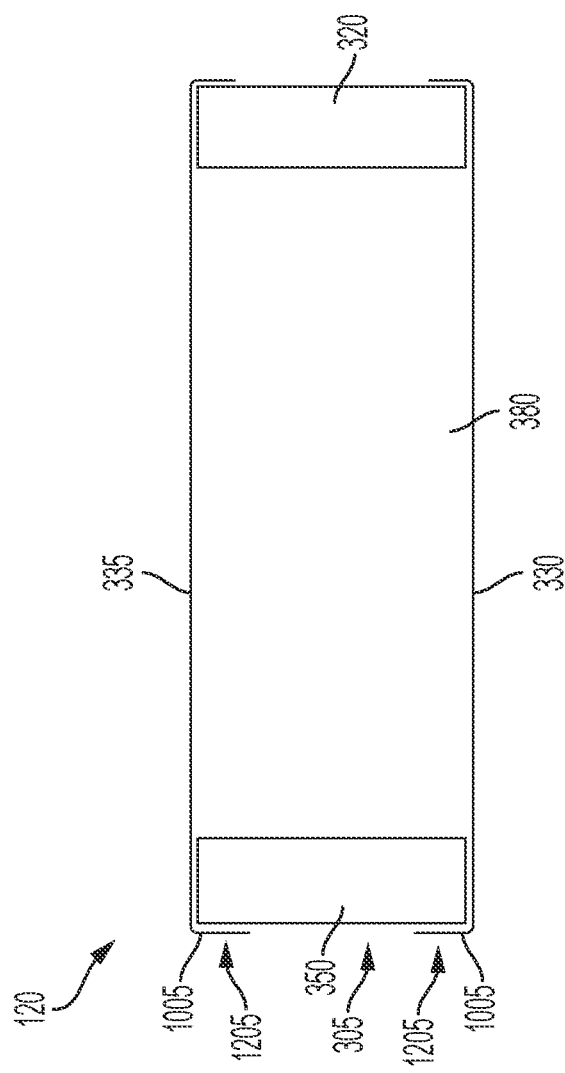
FIG. 12A depicts an example side view of a portion of a battery cell, in accordance with implementations.

FIG. 12A depicts a side view of the battery cell 120, according to an example implementation. The first enclosure member 330 or the second enclosure member 335 can include various shapes to facilitate coupling the first enclosure member 330 or the second enclosure member 335 with the body 305. For example, the first enclosure member 330 or the second enclosure member 335 can include a cup shape, an open box shape, or another shape that can at least partially surround, receive, or enclose the body 305. For example, the first enclosure member 330 or the second enclosure member 335 can include one or more bended end sections 1205 that can extend parallel with at least one outer wall or inner wall of the first side 320, the second side 350, the third side 380, or the fourth side 385. The bended end sections 1205 of the first enclosure member 330 or the second enclosure member 335 can couple with the body 305 by one or more welded joints (e.g., a lap weld 1005), fasteners, adhesives, or another technique. The bended end sections 1205 can be formed at a 90° angle relative to the first enclosure member 330 or the second enclosure member 335. The bended end sections 1205 can be formed at various other angles (e.g., 20°-165°). The bended end sections 1205 can be monolithically formed with the first enclosure member 330 or the second enclosure member 335 (e.g., by bending, stamping, pressing, or another technique). The bended end sections 1205 can couple with the first enclosure member 330 or the second enclosure member 335 by one or more welds, fasteners, adhesives, or other techniques. The bended end sections 1205 can be positioned at one point in the first enclosure member 330 or the second enclosure member 335, along a portion of the periphery, or along an entire periphery of the first enclosure member 330 or the second enclosure member 335 (e.g., all four sides).

Figure 12B:
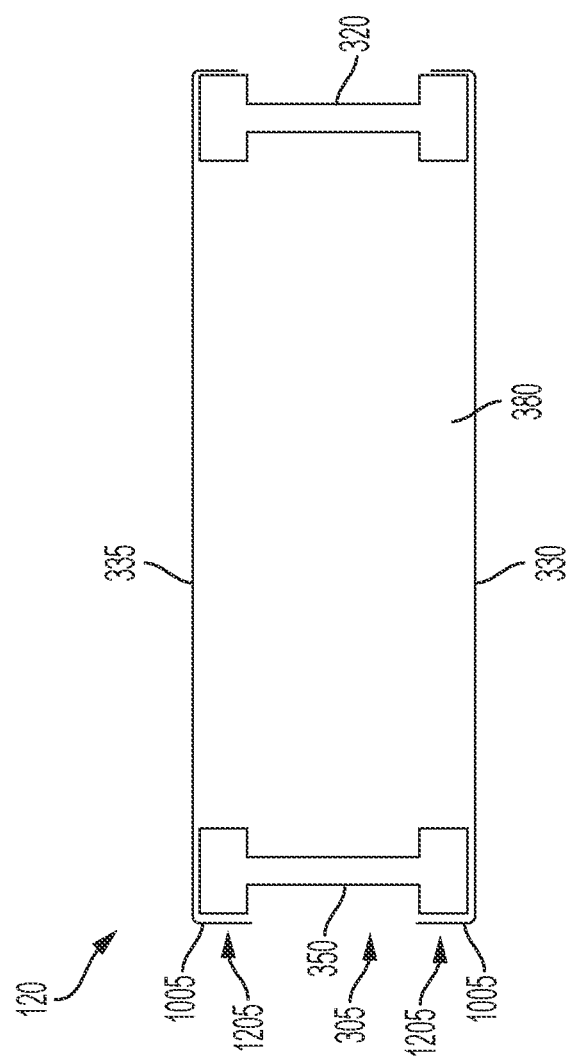
FIG. 12B depicts an example side view of a portion of a battery cell, in accordance with implementations.

FIG. 12B depicts a side view the battery cell 120, according to an example implementation. For example, FIG. 12B depicts a side view of the battery cell 120 in which the body 305 includes at least one "I" beam (e.g., the first side 320 and the second side 350). FIG. 12C depicts a perspective view of a portion of one body 305 having an "I" beam cross section coupled with a portion of another body 305 having an "I" beam cross section. For example, as described herein, at least one side of the body 305 can include end sections 1210 that are thicker in material than a middle section 1215. The body 305, or another portion of the battery cell 120, can include one or more insert molds 1220 that facilitates coupling a terminal 365, or another component, with the body 305. For example, the insert mold 1220 can include one or more metallic or non-metallic materials that can seal the terminal 365 with a portion of the body 305. The difference in thickness between the middle section 1215 of the "I" beam and the end sections 1210 can allow for the insert mold 1220 to lie flush with one or more portions of the body 305 (e.g., with the end sections 1210 as depicted in at least FIG. 12C). The insert mold 1220 can facilitate coupling a first body 305 with another body 305 (e.g., via one or more terminals).

FIGS. 13-17 depict example schematics of an electrode stack 1300, in accordance with implementations. As described herein, the battery cells 120 can be assembled, for example, by inserting a winded or stacked electrode stack 1300 (e.g., a jelly roll) including electrolyte material into the body 305. The housing 230 of the battery cell 120 (e.g., the body 305, the first enclosure member 330, or the second enclosure member 335) can receive or house various types of electrode stacks 1300. For example, as depicted in at least FIG. 13, the body 305 can receive a winded electrode stack 1300. The electrode stack 1300 can include at least one electrode 340 (e.g., an anode or cathode) and one or more separators 1305 disposed between the electrodes 340. The winded electrode stack 1300 can include a cylindrical winded stack, a prismatic winded stack, or another type of winded stack. For example, two are more electrodes 340 and separators 1305 can overlap one another and can be rolled (e.g., winded) into the electrode stack 1300.

As depicted in at least FIG. 14, the body 305 can receive a folded electrode stack 1300 having a continuous separator 1305 that is folded. For example, opposing electrodes 340 can be disposed alternatively between a folded separator 1305. In other words, opposing electrodes 340 can be disposed between individual folds of a folded separator 1305.

As depicted in at least FIG. 15, the body 305 can receive a layered electrode stack 1300 having a plurality of separators 1305. For example, opposing electrodes 340 can be disposed between an individual separator 1305.

As depicted in at least FIG. 16, the body 305 can receive a laminated electrode stack 1300. For example, at least one electrode 340 (e.g., a cathode) can be laminated with a separator 1305 and folded. Another electrode 340 (e.g., an anode) can be disposed between the folds of the laminated electrode 340 having the separator 1305.

As depicted in at least FIG. 17, the body 305 can receive an enclosed electrode stack 1300. For example, at least one electrode 340 (e.g., a cathode) can be enclosed, enwrapped, or surrounded by a separator 1305. Another electrode 340 (e.g., an anode) can be disposed adjacent to (e.g., on top of or below) the enclosed electrode 340 to form the electrode stack 1300. These examples are illustrative. The electrode 340 or the electrode stack 1300 disposed within the battery cell housing 230 (e.g., within the body 305) can be or can include various alternative or additional shapes, forms, sizes, or configurations.

Figure 18:
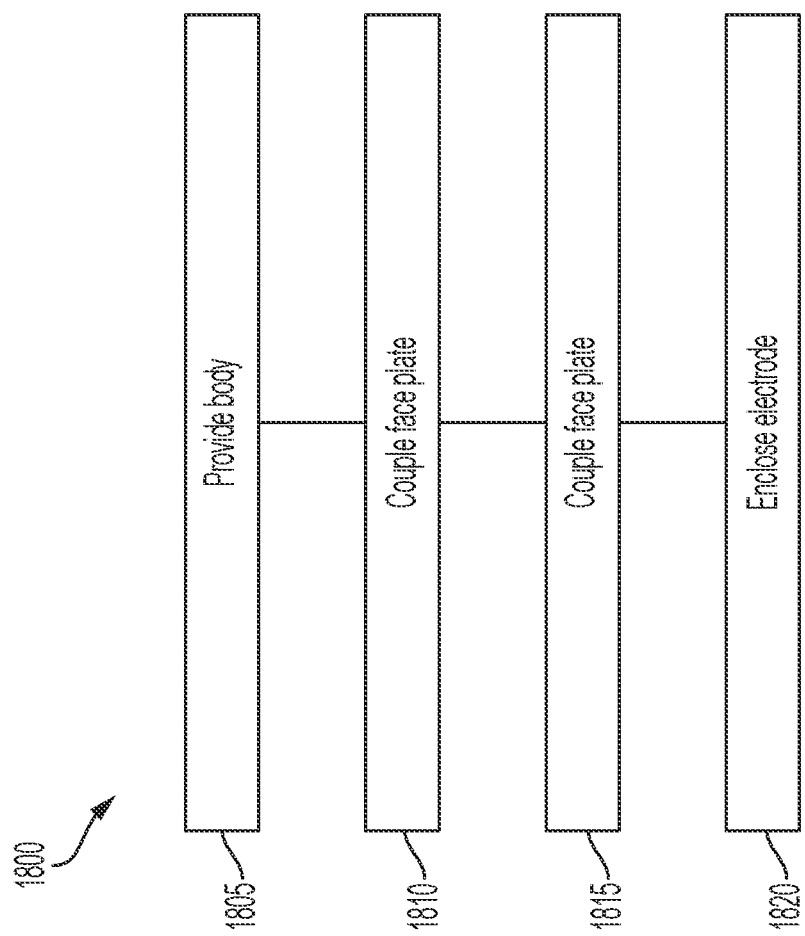
FIG. 18 depicts an example illustration of a process, in accordance with implementations.

FIG. 18 depicts an example illustration of a method 1800. The method 1800 can include providing the body 305, as depicted in act 1805. The body 305 can be or can form part of the battery cell housing 230. The body 305 can include various shapes including, but not limited to, a ring shape, a rectangular shape, a square shape, an enclosed shape, another shape, or various combinations thereof. The body 305 can include the first open area 310 and the second open area 315. Each of the first open area 310 and the second open area 315 can be or can include one or more areas of space defined in at least one direction. For example, the first open area 310 can include the area of space defined at least partially in between a bottom edge of the first side 320 of the body 305, a bottom edge of the second side 350 of the body 305, a bottom edge of a third side 380 of the body 305, and a bottom edge of a fourth side 385 of the body 305. The second open area 315 can include the area of space defined at least partially in between a top edge of the first side 320 of the body 305, a top edge of the second side 350 of the body 305, a top edge of the third side 380 of the body 305, and a top edge of the fourth side 385 of the body 305. The body 305 can define a generally rectangular ring shape having the first open area 310 and the second open area 315.

The method 1800 can include coupling the first enclosure member 330 with the body 305, as depicted in act 1810. For example, the first enclosure member 330 can be or can include one or more sheets of material that can couple with a portion of the body 305. The first enclosure member 330 can couple with the body 305 at the first open area 310. For example, the first enclosure member 330 can extend a length and width that substantially matches the first open area 310 such that the first enclosure member 330 can couple with the body 305 at the first open area 310 to enclose (e.g., surround, cover, position next to) the first open area 310. The first enclosure member 330 can be smaller or larger than the first open area 310 in one or more directions (e.g., in length or width). The first enclosure member 330 can couple with the body 305 in a variety of ways. For example, the first enclosure member 330 can be welded with the body 305 (e.g., at one or more portions of the first side 320, the second side 350, the third side 380, or the fourth side 385 of the body 305) such that the first enclosure member 330 and the body 305 connect by one or more welded joints. The first enclosure member 330 can couple with the body 305 in various other ways including by fasteners or adhesives. The first enclosure member 330 can be or can include one or more flat sheets of material such that the first enclosure member 330 includes at least one flat (e.g., plain) surface. The first enclosure member 330 can include one or more components (e.g., openings or other features) on the first enclosure member 330.

The method 1800 can include coupling the second enclosure member 335 with the body 305, as depicted in act 1815. For example, the second enclosure member 335 can be or can include one or more sheets of material that can couple with a portion of the body 305. The second enclosure member 335 can couple with the body 305 at the second open area 315. For example, the second enclosure member 335 can extend a length and width that substantially matches the second open area 315 such that the second enclosure member 335 can couple with the body 305 at the second open area 315 to enclose (e.g., surround, cover, position next to) the second open area 315. The second enclosure member 335 can be smaller or larger than the second open area 315 in one or more directions (e.g., in length or width). The second enclosure member 335 can couple with the body 305 in a variety of ways. For example, the second enclosure member 335 can be welded with the body 305 (e.g., at one or more portions of the first side 320, the second side 350, the third side 380, or the fourth side 385 of the body 305) such that the second enclosure member 335 and the body 305 connect by one or more welded joints. The second enclosure member 335 can couple with the body 305 in various other ways including by fasteners or adhesives. The second enclosure member 335 can be or can include one or more flat sheets of material such that the second enclosure member 335 includes at least one flat (e.g., plain) surface. The second enclosure member 335 can include one or more components (e.g., openings or other features) on the second enclosure member 335.

The method 1800 can include enclosing an electrode 340, as depicted in act 1820. For example, the first enclosure member 330 and the second enclosure member 335 can couple with the body 305 such that the body 305, the first enclosure member 330 and the second enclosure member 335 can enclose at least one electrode 340. For example, the body 305 can receive the electrode 340 (e.g., prior to coupling the enclosure members, simultaneously with coupling the enclosure members, or after coupling the enclosure members via one or more fill ports) such that the electrode 340 is disposed at least partially within the body 305, the first enclosure member 330, and the second enclosure member 335 (e.g., the body 305, the first enclosure member 330, and the second enclosure member 335 form the battery cell housing 230).

The battery cell 120 can include a generally long, thin shape. For example, a length of the first enclosure member 330 (e.g., along the length axis 392 in a direction that extends laterally from the first side 320 of the body 305 towards the second side 350) and a width of the first enclosure member 330 (e.g., along a width axis 396 that is perpendicular to the length axis 392 and a height axis 394) can each be greater in dimension than a height 375 of the body 305 (e.g., in a direction that extends from the first open area 310 towards the second open area 315) such that the body 305 generally defines a long, thin (e.g., in height, along the height axis 394) shape. In other words, the body 305 of the battery cell 120 can lay flat on a surface such that the first enclosure member 330 lies flush with the surface and the height 375 of the body 305 extending away from the surface can be less than both a length of the first enclosure member 330 (e.g., that is in contact with the surface) and a width of the first enclosure member 330 (e.g., that is in contact with the surface). The long, thin body 305 can allow for a short insertion depth of the electrode 340. For example, the length of the body 305 can be longer than the height 375 such that the corresponding length of the electrode stack received by the body 305 is longer than the height of the electrode stack.

Figure 19:
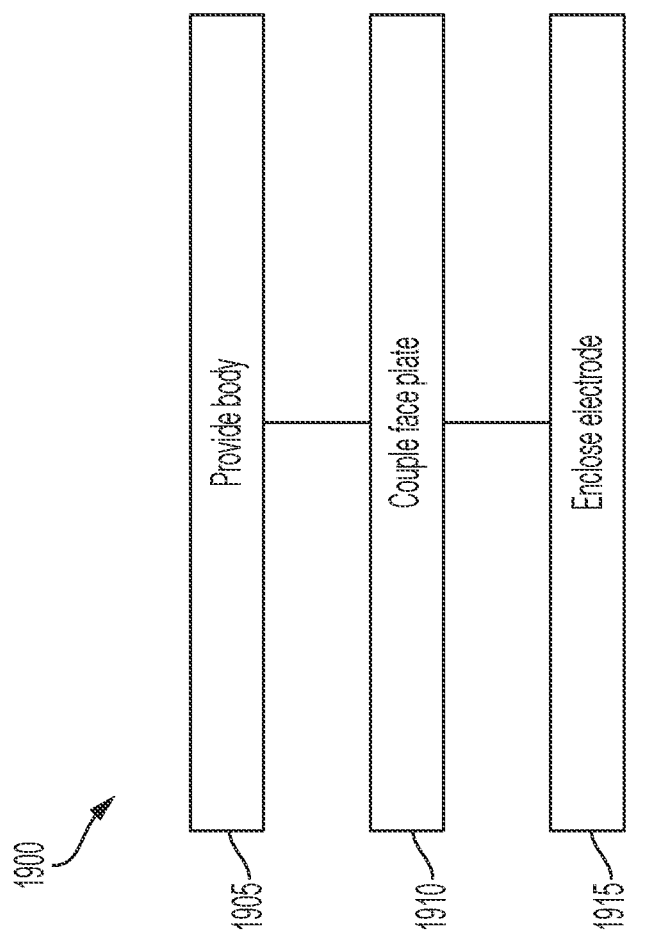
FIG. 19 depicts an example illustration of a process, in accordance with implementations.

FIG. 19 depicts an example illustration of a method 1900. The method 1900 can include providing the body 305, as depicted in act 1905. For example, the body 305 of the battery cell 120 can include the first enclosure member 330 integrally (e.g., monolithically) formed with the body 305 (e.g., with the first side 320, the second side 350, the third side 380, or the fourth side 385). The first side 320, the second side 350, the third side 380, or the fourth side 385 of the body 305 can at least partially define an open space 405 of the battery cell 120. For example, the open space 405 can include an open area extending laterally and longitudinally (e.g., along the length axis 392 and along the width axis 396) along a topmost portion of the body 305. The open space 405 can include an open volume extending in a height direction (e.g., along the height axis 394) between the first side 320, the second side 350, the third side 380, and the fourth side 385.

The method 1900 can include coupling the second enclosure member 335 with the body 305, as depicted in act 1910. The body 305 can couple with the second enclosure member 335 such that the second enclosure member 335 at least partially encloses, surrounds, contacts, or abuts the open space 405. The body 305 can couple with the second enclosure member 335 by various techniques including welding, fasteners, or adhesives.

The method 1900 can include enclosing an electrode 340, as depicted in act 1915. For example, the open space 405 of the body can receive one or more of the electrodes 340 such that the electrode 340 can be enclosed by the body 305 (e.g., the first side 320, the second side 350, the third side 380, and the fourth side 385 of the body 305) and by the second enclosure member 335. The body 305 can include the first side 320, the second side 350, the third side 380, the fourth side 385, and the first enclosure member 330 formed as one or more continuous sheets of material. For example, the body 305 can be formed by deep drawing (e.g., drawing a sheet of material into a forming die by a punch) a sheet of material in a direction from the open space 405 towards the first enclosure member 330 (e.g., in a direction parallel with the height axis 394). The body 305 can be formed from various other processes and techniques including, but not limited to, stamping, forging, casting, punching, extrusion, machining, cutting, or other techniques.

The battery cell 120 can include a generally long, thin shape. For example, a length of the first enclosure member 330 (e.g., along the length axis 392 in a direction that extends laterally from the first side 320 of the body 305 towards the second side 350) and a width of the first enclosure member 330 (e.g., along a width axis that is perpendicular to the length axis 392 and a height axis 394) can each be greater in dimension than a height 375 of the body 305 (e.g., in a direction that extends from the open space 405 towards the first enclosure member 330) such that the body 305 generally defines a long, thin (e.g., in height, along the height axis 394) shape. In other words, the body 305 of the battery cell 120 can lay flat on a surface such that the first enclosure member 330 lies flush with the surface and the height 375 of the body 305 extending away from the surface can be less than both a length of the first enclosure member 330 (e.g., that is in contact with the surface) and a width of the first enclosure member 330 (e.g., that is in contact with the surface). The body 305 can include one or more radii 410 that extend along a portion of the first side 320, the second side 350, the third side 380, or the fourth side 385 between the side and the first enclosure member 330. The radius 410 can facilitate eliminating or reducing stress at the interface between the sides and the first enclosure member 330.

Figure 20:
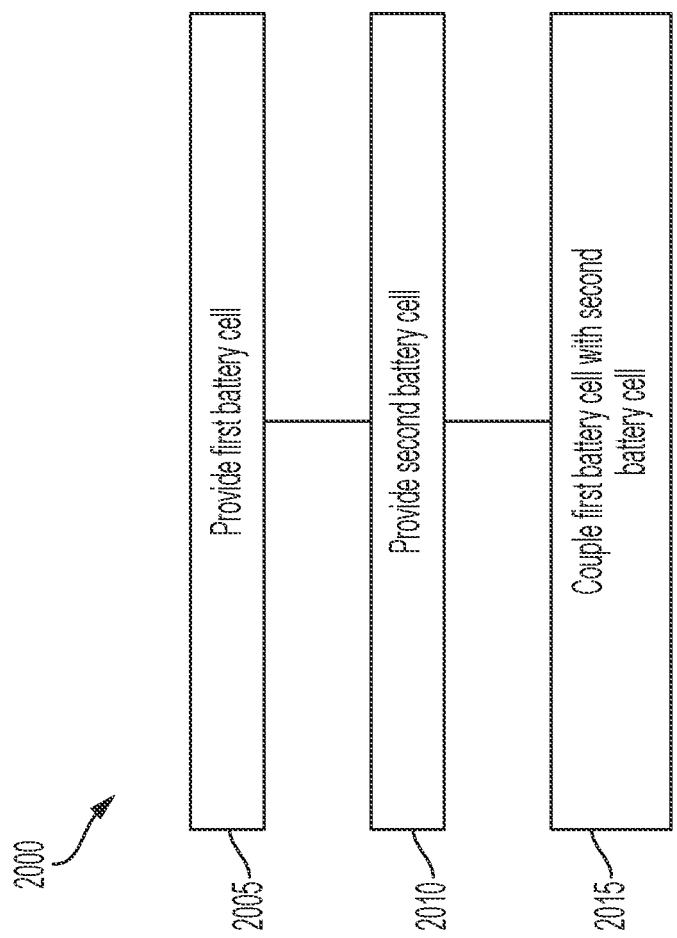
FIG. 20 depicts an example illustration of a process, in accordance with implementations.

FIG. 20 depicts an example illustration of a method 2000. The method 2000 can include providing a first battery cell 120, as depicted in act 2005. The first battery cell 120 can include a body 305. As described herein, the body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2000 can include providing a second battery cell 120, as depicted in act 2010. The second battery cell 120 can include a body 305. As described herein, the body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2000 can include coupling the first battery cell 120 with the second battery 120, as depicted in act 2015. For example, the battery cells 120 can couple with one another in series by the first terminal 365 and the second terminal 370 disposed along opposing sides (e.g., the first side 320 or the opposing second side 350). For example, the battery cells 120 can couple with one another such that the cell cluster forms a long, thin string of battery cells 120 (e.g., such that the system 500 includes a larger length and width of each battery cell 120 within the system 500 than a height 375 of the battery cells 120 or the height of the system 500). For example, the battery cells 120 can couple with one another by the first side 320 and the second side 350 such that the system 500 includes a longer length than width or height. The battery cells 120 can couple with one another such that the terminals oppose one another in the string (e.g., the first terminal 365 can connect with the second terminal 370 by welding or another technique). One or more spaces or insulating materials can be disposed between the first terminal 365 and the second terminal 370 when the battery cells 120 are connected. For example, the first terminal 365 and the second terminal 370 can protrude from the first side 320 or the second side 350 of the body 305 such that a space can form between the bodies 305 even when the terminals are welded together.

Figure 21:
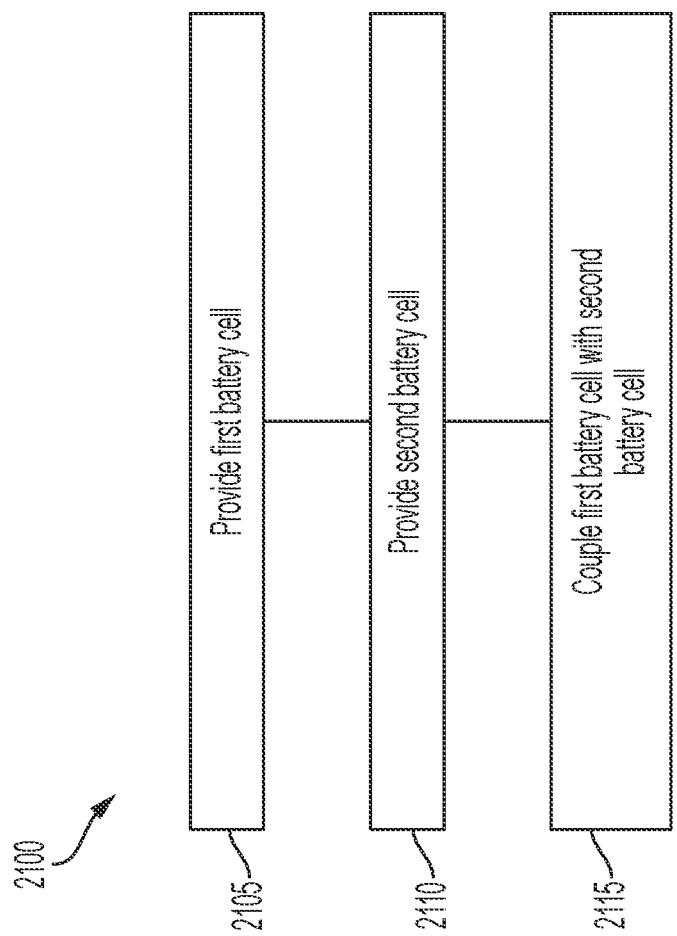
FIG. 21 depicts an example illustration of a process, in accordance with implementations.

FIG. 21 depicts an example illustration of a method 2100. The method 2100 can include providing a first battery cell 120, as depicted in act 2105. The first battery cell 120 can include a body 305. As described herein, the body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2100 can include providing a second battery cell 120, as depicted in act 2110. The second battery cell 120 can include a body 305. As described herein, the body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2100 can include coupling the first battery cell 120 with the second battery 120, as depicted in act 2115. For example, the battery cells 120 can couple with one another in parallel by the first terminal 365 and the second terminal 370 disposed along opposing sides (e.g., the first side 320 or the opposing second side 350) and by electrically coupling the terminals by one or more busbars or other components. For example, the battery cells 120 can couple with one another such that the cell cluster forms a tall stack of battery cells 120 (e.g., such that the system 500 includes battery cells 120 overlapping one another by the first enclosure member 330 or the second enclosure member 335). For example, the system 500 can include a larger height than width. The battery cells 120 can couple with one another such that the terminals oppose one another in the string (e.g., the first terminal 365 can connect with the second terminal 370 by a welded busbar or another technique). As described herein, the battery cell system 500 can receive a load force exerted on one or more portions of the bodies 305 of the battery cells 120. For example, the first enclosure member 330, the second enclosure member 335, or the body 305 can maintain position or structure even when a load force is exerted on one or more portions of the first enclosure member 330, the second enclosure member 335, or the body 305.

Figure 22:
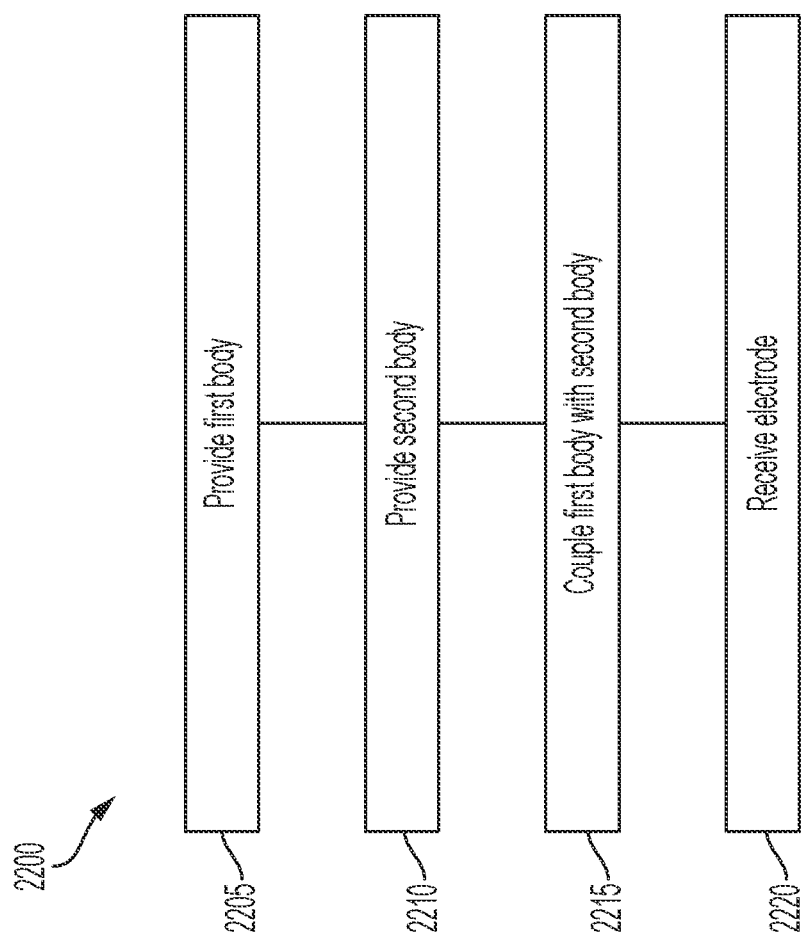
FIG. 22 depicts an example illustration of a process, in accordance with implementations.

FIG. 22 depicts an example illustration of a method 2200. The method 2200 can include providing a first body 305, as depicted in act 2205. As described herein, the first body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2200 can include providing a second body 305, as depicted in act 2210. As described herein, the second body 305 can include the first side 320, the second side 350, the third side 380, or the fourth side 385. The body 305 can include the first open area 310 and the second open area 315 or the body 305 can include the open space 405 defined at least partially by the first side 320, the second side 350, the third side 380, the fourth side 385, and the first enclosure member 330. The body 305 can include one or more openings or other features (e.g., terminals) disposed along the sides of the body 305.

The method 2200 can include coupling the first body 305 with the second body 305, as depicted in act 2215. For example, the battery cells 120 can couple with one another in series by the first terminal 365 and the second terminal 370 disposed along opposing sides (e.g., the first side 320 or the opposing second side 350) and electrically coupling by one or more busbars or other components. For example, the battery cells 120 can couple with one another such that the cell cluster forms a long, thin string of battery cells 120 (e.g., such that the system 500 includes a larger length and width of each battery cell 120 within the system 500 than a height 375 of the battery cells 120 or the height of the system 500). For example, the battery cells 120 can couple with one another by the first side 320 and the second side 350 such that the system 500 includes a longer length than width or height.

The method 2200 can include receiving an electrode 340, as depicted in act 2220. For example, the bodies 305 of the battery cells 120 can couple with one another prior to each body receiving a corresponding electrode 340. For example, a first side 320 of the first body 305 can couple with a second side 350 of the second body 305 while the second enclosure member 335 is not coupled with the body 305. Each body 305 can receive an electrode 340. Each second enclosure member 335 can be welded with a portion of each body 305 to form the system 500. The battery cells 120 can couple with one another such that the terminals oppose one another in the string (e.g., the first terminal 365 can connect with the second terminal 370 by a welded joint or another technique). The body 305 of the battery cells 120 in the system 500 can include the first enclosure member 330 integrally (e.g., monolithically) formed or coupled by welding. The bodies 305 can be manufactured or welded together at the same time (e.g., simultaneously) or in sequence. The bodies 305 can receive each electrode 340 at the same time (e.g., simultaneously) or in sequence.

Figure 23:
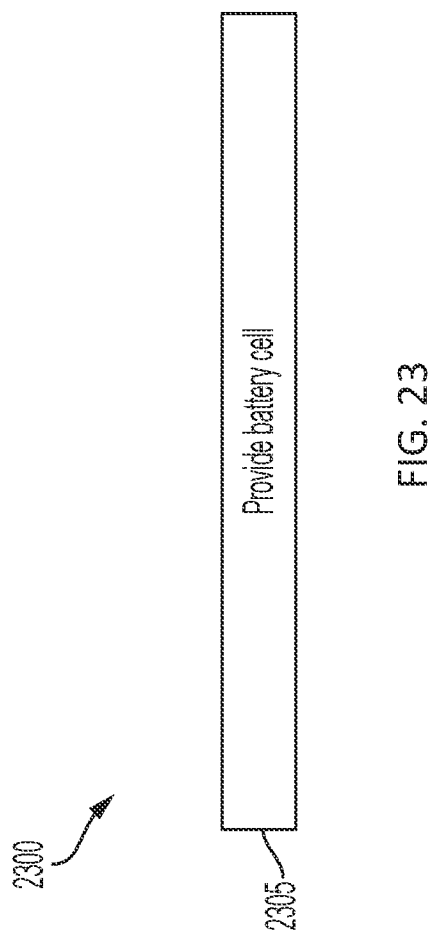
FIG. 23 depicts an example illustration of a process, in accordance with implementations.

FIG. 23 depicts an example illustration of a method 2300. The method 2300 can include providing a battery cell 120, as depicted in act 2305. The battery cell 120 can include at least one body 305. For example, the body 305 can be or can form part of the battery cell housing 230. The body 305 can include various shapes including, but not limited to, a ring shape, a rectangular shape, a square shape, an enclosed shape, another shape, or various combinations thereof. The body 305 can include a first open area 310 and a second open area 315. Each of the first open area 310 and the second open area 315 can be or can include one or more areas of space defined in at least one direction. For example, the first open area 310 can include a space defined along a bottom portion of the body 305 that extends along a length and width of the body 305 and the second open area 315 can include a space defined along a top portion of the body 305 that extends along a length and width of the body 305. The body 305 can define a generally rectangular ring shape having the first open area 310 and the second open area 315.

The battery cell 120 can include at least one first enclosure member 330. For example, the first enclosure member 330 can be or can include one or more sheets of material that can couple with a portion of the body 305. The first enclosure member 330 can couple with the body 305 at the first open area 310. The first enclosure member 330 can couple with the body 305 in a variety of ways. For example, the first enclosure member 330 can be welded with the body 305 (e.g., at one or more portions of the first side 320, the second side 350, the third side 380, or the fourth side 385 of the body 305) such that the first enclosure member 330 and the body 305 connect by one or more welded joints. The first enclosure member 330 can couple with the body 305 in various other ways including by fasteners or adhesives. The first enclosure member 330 can be or can include one or more flat sheets of material such that the first enclosure member 330 includes at least one flat (e.g., plain) surface.

The battery cell 120 can include at least one second enclosure member 335. For example, the second enclosure member 335 can be or can include one or more sheets of material that can couple with a portion of the body 305. The second enclosure member 335 can couple with the body 305 at the second open area 315. The second enclosure member 335 can couple with the body 305 in a variety of ways. For example, the second enclosure member 335 can be welded with the body 305 (e.g., at one or more portions of the first side 320, the second side 350, the third side 380, or the fourth side 385 of the body 305) such that the second enclosure member 335 and the body 305 connect by one or more welded joints. The second enclosure member 335 can couple with the body 305 in various other ways including by fasteners or adhesives. The second enclosure member 335 can be or can include one or more flat sheets of material such that the second enclosure member 335 includes at least one flat (e.g., plain) surface.

The first enclosure member 330 and the second enclosure member 335 can couple with the body 305 such that the body 305, the first enclosure member 330 and the second enclosure member 335 can enclose at least one electrode 340. For example, the body 305 can receive the electrode 340 (e.g., prior to coupling the enclosure members, simultaneously with coupling the enclosure members, or after coupling the enclosure members via one or more fill ports) such that the electrode 340 is disposed at least partially within the body 305, the first enclosure member 330, and the second enclosure member 335 (e.g., the body 305, the first enclosure member 330, and the second enclosure member 335 form the battery cell housing 230).

FIG. 24 depicts an example illustration of a method 2400. The method 2400 can include providing a battery cell 120, as depicted in act 2405. The battery cell 120 can include a body 305. The body 305 of the battery cell 120 can include the first enclosure member 330 integrally (e.g., monolithically) formed with the body 305 (e.g., with the first side 320, the second side 350, the third side 380, or the fourth side 385). The first side 320, the second side 350, the third side 380, or the fourth side 385 of the body 305 can at least partially define an open space 405 of the battery cell 120. For example, the open space 405 can include an open area extending laterally and longitudinally (e.g., along the length axis 392 and along the width axis 396) along a topmost portion of the body 305. The open space 405 can include an open volume extending in a height direction (e.g., along the height axis 394) between the first side 320, the second side 350, the third side 380, and the fourth side 385. The body 305 can couple with the second enclosure member 335 such that the second enclosure member 335 at least partially encloses, surrounds, contacts, or abuts the open space 405. The open space 405 can receive one or more of the electrodes 340 such that the electrode 340 can be enclosed by the body 305 (e.g., the first side 320, the second side 350, the third side 380, and the fourth side 385 of the body 305) and by the second enclosure member 335. The body 305 can couple with the second enclosure member 335 by various techniques including welding, fasteners, or adhesives.

The body 305 can include the first side 320, the second side 350, the third side 380, the fourth side 385, and the first enclosure member 330 formed as one or more continuous sheets of material. For example, the body 305 can be formed by deep drawing a sheet of material in a direction from the open space 405 towards the first enclosure member 330.

FIG. 25 depicts an example illustration of a method 2500. The method 2500 can include providing a system 500, as depicted in act 2505. The system 500 can include a plurality of battery cells 120. The battery cells 120 can electrically couple with one another in series by the first terminal 365 and the second terminal 370 disposed along opposing sides (e.g., the first side 320 or the opposing second side 350). For example, the battery cells 120 can couple with one another such that the cell cluster forms a long, thin string of battery cells 120. For example, the battery cells 120 can couple with one another by the first side 320 and the second side 350 such that the system 500 includes a longer length than width or height. The battery cells 120 can couple with one another such that the terminals oppose one another in the string (e.g., the first terminal 365 can connect with the second terminal 370 by welding or another technique). The body 305 of the battery cells 120 in the system 500 can include the first enclosure member 330 integrally (e.g., monolithically) formed or coupled by welding. One or more spaces or insulating materials can be disposed between the first terminal 365 and the second terminal 370 when the battery cells 120 are connected. For example, the first terminal 365 and the second terminal 370 can protrude from the first side 320 or the second side 350 of the body 305 such that a space can form between the bodies 305 even when the terminals are welded together.

FIG. 26 depicts an example illustration of a method 2600. The method 2600 can include providing a system 500, as depicted in act 2605. The system 500 can include a plurality of battery cells 120. The battery cells 120 can couple with one another in parallel by the first terminal 365 and the second terminal 370 disposed along opposing sides (e.g., the first side 320 or the opposing second side 350) and by electrically coupling the terminals by one or more busbars or other components. For example, the battery cells 120 can couple with one another such that the cell cluster forms a tall stack of battery cells 120 (e.g., such that the system 500 includes battery cells 120 overlapping one another by the first enclosure member 330 or the second enclosure member 335). For example, the system 500 can include a larger height than width. The battery cells 120 can couple with one another such that the terminals oppose one another in the string (e.g., the first terminal 365 can connect with the second terminal 370 by a welded busbar or another technique). The body 305 of the battery cells 120 in the system 500 can include the first enclosure member 330 integrally (e.g., monolithically) formed or coupled by welding.

FIG. 27 depicts an example illustration of a method 2700. The method 2700 can include providing a system 500, as depicted in act 2705. The system 500 can include a plurality of battery cells 120. The battery cells 120 can couple with one another in series by the first terminal 365 and the second terminal 370 disposed along opposing sides (e.g., the first side 320 or the opposing second side 350) and electrically coupling by one or more busbars or other components. For example, the battery cells 120 can couple with one another such that the cell cluster forms a long, thin string of battery cells 120. For example, the battery cells 120 can couple with one another by the first side 320 and the second side 350 such that the system 500 includes a longer length than width or height. The bodies 305 can be manufactured or welded together at the same time (e.g., simultaneously) or in sequence. The bodies 305 can receive each electrode 340 at the same time (e.g., simultaneously) or in sequence.

The body 305 of the battery cells 120 can couple with one another prior to each body receiving a corresponding electrode 340. For example, a first side 320 of a first body 305 can couple with a second side 350 of a second body 305 while the second enclosure member 335 is not coupled with the body 305. Each body 305 can receive an electrode 340. Each second enclosure member 335 can be welded with a portion of each body 305 to form the system 500. The battery cells 120 can couple with one another such that the terminals oppose one another in the string (e.g., the first terminal 365 can connect with the second terminal 370 by a welded joint or another technique). The body 305 of the battery cells 120 in the system 500 can include the first enclosure member 330 integrally (e.g., monolithically) formed or coupled by welding.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell, comprising:
a body, the body defining an opening formed between a first end face, an opposing second end face, a first side, and an opposing second side of the body;
a first enclosure member to couple with the body and a second enclosure member to couple with the body;
the body, the first enclosure member, and the second enclosure member configured to enclose an electrode within the opening between the first end face and the second end face of the body;

the first end face extending in a height direction between a first end, a second end, and a middle portion disposed therebetween, the first end and the second end having a thickness greater than a thickness of the middle portion;
the first enclosure member including a curved end that overlaps the first end of the first end face of the body to couple with the body by a first lap welded joint disposed along the curved end; and
a ratio between a length of the body and a height of the body is at least 50:1.

2. The battery cell of claim 1, comprising:
the length of the body extends in a lateral direction from the first end face of the body towards the second end face; and
a ratio between a thickness of at least a portion of the body to a thickness of at least a portion of the first enclosure member is at least 5:1.

3. The battery cell of claim 1, comprising:
the body comprises a rectangular ring shape having the first end face, the second end face, the first side, and the second side;
the first enclosure member comprises a first face plate; and
the second enclosure member comprises a second face plate coupled with the body by a second welded joint.

4. The battery cell of claim 1, comprising:
the first end face of the body includes a first opening and a second opening;
the first opening comprises a filling port; and
the second opening comprises a vent.

5. The battery cell of claim 1, comprising:
the length of the body is between 100 and 1000 millimeters; and
the height of the body is between 0 and 20 millimeters.

6. The battery cell of claim 1, comprising:
a first terminal disposed on the first end face of the body; and
a second terminal disposed on the second end face of the body.

7. The battery cell of claim 1, comprising:
the first enclosure member and the second enclosure member comprise flat sheets of material.

8. The battery cell of claim 1, comprising:
the second enclosure member including a second curved end that overlaps the second end of the first end face of the body and to couple with the body by a second lap welded joint disposed along the second curved end.

9. The battery cell of claim 1, comprising:
the first enclosure member includes a first stamped section that defines a first spring and a second stamped section that defines a second spring;
the first spring including a protrusion that is configured to contact an inner surface of the first end face of the body; and
the second spring configured to engage with the second end face of the body.

10. The battery cell of claim 1, comprising:
the first enclosure member comprises a cup shape.

11. The battery cell of claim 1, comprising:
the electrode is formed from at least one of a wounded electrode stack, a folded electrode stack, a laminated electrode stack, or an enclosed electrode stack; and
the electrode includes at least one separator coupled with the electrode stack, the at least one separator to separate a first portion of the electrode stack from a second portion of the electrode stack.

12. The battery cell of claim 1, comprising:
the first end face of the body including an insert mold coupled with the middle portion of the first end face; and
the insert mold to seal a terminal with the body.

13. The battery cell of claim 1, comprising:
the first side of the body including a first end section, a second end section, and a middle section disposed therebetween; and
the first end section and the second end section having a greater thickness than the middle section such that the first side defines an I-beam.

14. A battery cell, comprising:
a body, the body defining an opening formed between a first end face, an opposing second end face, a first side, and an opposing second side of the body;
a first enclosure member to couple with the body;
a second enclosure member to couple with the body;
the body, the first enclosure member, and the second enclosure member configured to enclose an electrode within the opening between the first end face and the second end face of the body;
the first end face extending in a height direction between a first end, a second end, and a middle portion disposed therebetween, the first end and the second end having a thickness greater than a thickness of the middle portion;
the first enclosure member including a curved end that overlaps the first end of the first end face of the body to couple with the body by a first lap welded joint disposed along the curved end; and
a ratio between a length of the body and a height of the body is in a range between 100:1 and 10:1.

15. The battery cell of claim 14, comprising:
the height direction of the body extends in a direction from the second enclosure member towards the first enclosure member; and
the length of the body extends in a lateral direction from the first end face of the body towards the second end face.

16. The battery cell of claim 14, comprising:
the body formed by deep drawing a sheet of material in the height direction from the second enclosure member towards the first enclosure member.

17. The battery cell of claim 14, comprising:
the second enclosure member including a second curved end that overlaps the second end of the first end face of the body to couple with the body by a second lap welded joint disposed along the second curved end.

18. The battery cell of claim 14, comprising:
the second enclosure member includes a first stamped section that defines a first spring and a second stamped section that defines a second spring;
the first spring including a protrusion that is configured to contact an inner surface of the first end face of the body; and
the second spring configured to engage with the second end face.

19. A battery cell, comprising:
a body, the body defining an opening formed between a first end face, an opposing second end face, a first side, and an opposing second side of the body;
a first enclosure member to couple with the body;
a second enclosure member to couple with the body;
the body, the first enclosure member, and the second enclosure member configured to enclose an electrode within the opening between the first end face and the second end face of the body;

the first end face extending in a height direction between a first end, a second end, and a middle portion disposed therebetween, the first end and the second end having a thickness greater than a thickness of the middle portion;

the first enclosure member including a curved end that overlaps the first end of the first end face of the body to couple with the body by a first lap welded joint disposed along the curved end; and a length of the body and a width of the body are each greater than a height of the body.

20. The battery cell of claim 19, comprising:

the length of the body extends in a lateral direction from the first end face of the body towards the second end face; and the height of the body extends in a direction that is perpendicular to the length of the body.

\* \* \* \* \*